United States Patent
Kumar et al.

(10) Patent No.: US 11,016,671 B2
(45) Date of Patent: May 25, 2021

(54) SNAPSHOT BLOCK STORAGE PATH STRUCTURE WHEREIN IDENTIFICATION OF BLOCKS THAT ARE IDENTICAL BETWEEN TWO SNAPSHOTS ARE DETERMINED WITHOUT PERFORMING BLOCK BY BLOCK COMPARISON BETWEEN THE TWO SNAPSHOTS

(71) Applicant: Amazon Technologies, Inc., Seattle, WA (US)

(72) Inventors: Sandeep Kumar, Sammamish, WA (US); Chakravarthi Kalyana Valicherla, Redmond, WA (US); Ashish Palekar, Clyde Hill, WA (US); Rucha Nene, Seattle, WA (US); Shailendra Verma, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 64 days.

(21) Appl. No.: 16/586,640

(22) Filed: Sep. 27, 2019

(65) Prior Publication Data
US 2021/0096960 A1 Apr. 1, 2021

(51) Int. Cl.
*G06F 3/06* (2006.01)

(52) U.S. Cl.
CPC ............ *G06F 3/0611* (2013.01); *G06F 3/064* (2013.01); *G06F 3/065* (2013.01); *G06F 3/067* (2013.01)

(58) Field of Classification Search
CPC ......... G06F 3/064; G06F 3/0611; G06F 3/065
See application file for complete search history.

(56) References Cited

U.S. PATENT DOCUMENTS

| | | | |
|---|---|---|---|
| 9,417,815 B1 | 8/2016 | Elisha | |
| 9,569,123 B2 | 2/2017 | Desantis et al. | |
| 10,324,803 B1 | 6/2019 | Agarwal | |
| 10,437,787 B2* | 10/2019 | Plisko | G06F 16/178 |
| 10,545,776 B1 | 1/2020 | Kowalski et al. | |
| 2003/0182313 A1* | 9/2003 | Federwisch | G06F 16/10 |
| 2014/0181021 A1* | 6/2014 | Montulli | G06F 16/178 |
| | | | 707/624 |

* cited by examiner

*Primary Examiner* — Reginald G Bragdon
*Assistant Examiner* — Chie Yew
(74) *Attorney, Agent, or Firm* — Knobbe Martens Olson & Bear, LLP

(57) ABSTRACT

Generally described, one or more aspects of the present application relate to a public snapshot service for creating and managing block-level snapshots. For example, the public snapshot service can create a snapshot based on (i) a specification of a parent snapshot to be used as a basis for a given snapshot, and (ii) a specification of the data blocks to be backed up in the given snapshot. The data blocks in the snapshot may be stored in a specific storage path structure that facilitates computation of a block difference with respect to the parent snapshot.

14 Claims, 17 Drawing Sheets

SNAPSHOT BLOCK STORAGE PATH STRUCTURE WHEREIN IDENTIFICATION OF BLOCKS THAT ARE IDENTICAL BETWEEN TWO SNAPSHOTS ARE DETERMINED WITHOUT PERFORMING BLOCK BY BLOCK COMPARISON BETWEEN THE TWO SNAPSHOTS

CROSS-REFERENCE TO RELATED APPLICATIONS

This application is being filed concurrently with the following U.S. Applications, each of which is incorporated herein by reference in its entirety:

| U.S. application No. | Attorney Docket | Title | Filing Date |
|---|---|---|---|
| TBD | SEAZN.1612A | NETWORK-ACCESSIBLE BLOCK-LEVEL SNAPSHOTS | Sep. 27, 2019 |
| TBD | SEAZN.1614A | MANIFEST INDEX FOR BLOCK-LEVEL SNAPSHOTS | Sep. 27, 2019 |
| TBD | SEAZN.1615A | SUB-BLOCK MODIFICATIONS FOR BLOCK-LEVEL SNAPSHOTS | Sep. 27, 2019 |

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, set up with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively static infrastructure of on-premises computing environments, requires a system architecture that can reliably re-allocate its hardware according to the changing needs of its user base.

DETAILED DESCRIPTION

Introduction

Figure 1:
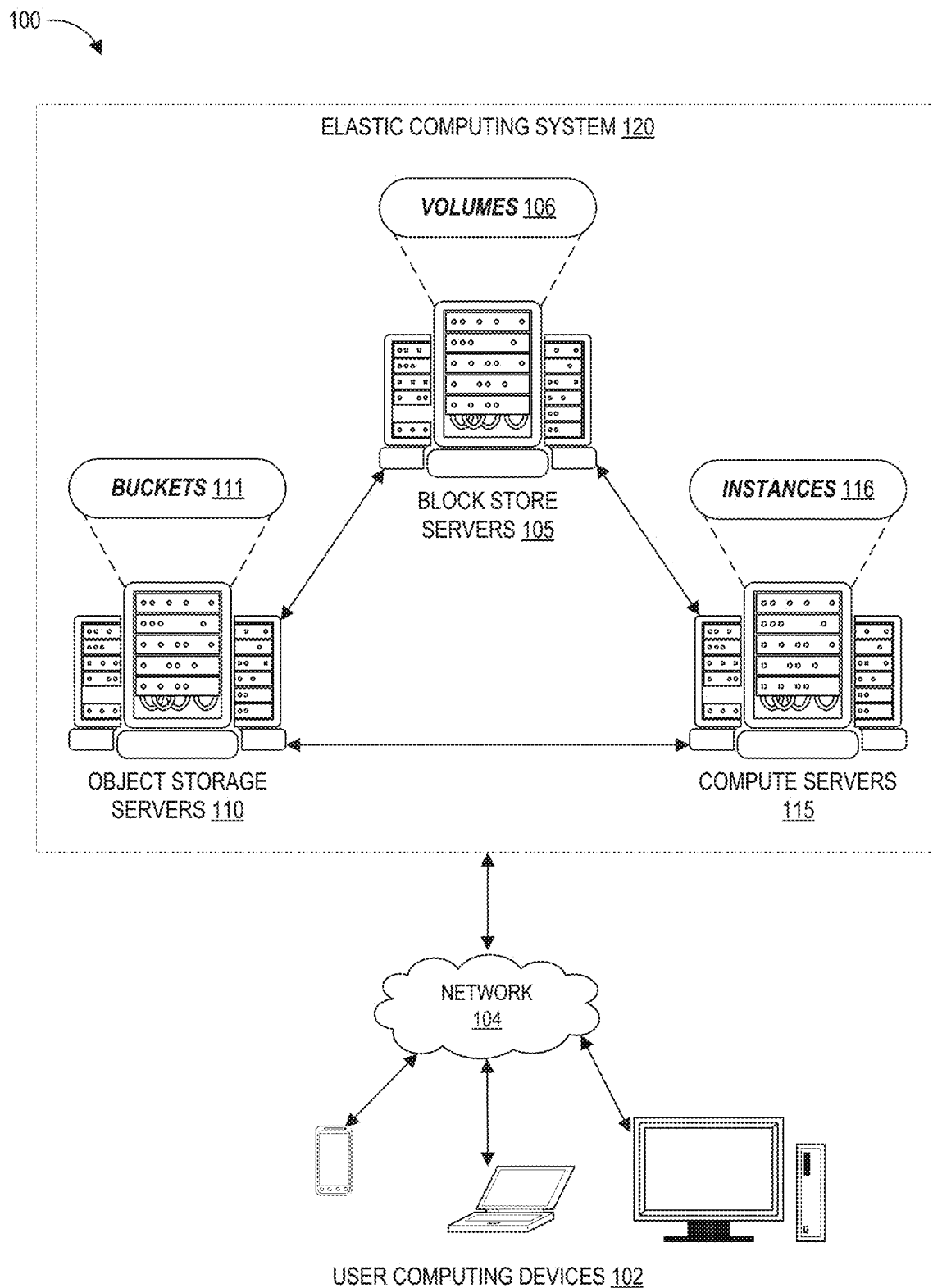
FIG. 1 depicts a schematic diagram of an elastic computing system in which various embodiments according to the present disclosure can be implemented.

Generally described, aspects of the present disclosure relate to the more interactive and efficient creation and management of "snapshots" (e.g., computing objects that each represent values of every block of a block storage volume or device at a specific point in time), for example, of volumes of data stored using block storage within a networked elastic computing system or on-premises storage systems external to such a networked elastic computing system (also referred to herein as private data storage servers). In some implementations, the described technology can beneficially facilitate faster and more efficient snapshot creation and management for snapshots created within a cloud environment as backups of external block storage volumes (e.g., block storage volumes stored outside of the cloud environment). In general, a volume can correspond to a logical collection of data, such as a set of data maintained on a user's own proprietary data server or maintained on a data server in the cloud on behalf of a user. Snapshots are typically used to back up block storage, such as a hard drive, so that the device can be reverted to a previous state (e.g., in the event of data corruption or failure).

Typically, such snapshots are created periodically, and including all of the available data of the volume in each of the snapshots may consume unnecessary amounts of network, processor, and storage resources, especially if most of the data included in the snapshots remains unchanged between snapshots. Thus, in some cases, to reduce the amount of computing resources consumed in creating and storing such snapshots, snapshots may be incremental in that they only store the data of blocks that have changed in value since the most recent snapshot (or a "parent" snapshot). However, identifying the blocks that have changed in value since the most recent snapshot by performing a block-by-block data comparison can be time-consuming, especially for snapshots associated with large amounts of data. Also, storing all differences (e.g., all blocks that have changed in value since the most recent snapshot) may involve storing unnecessary information such as changes to page files or other temporary data that may not be needed in a snapshot.

One option to address the aforementioned problems is to create snapshots directly within an operating system, as the operating system generally has knowledge of what blocks represent what files (and thus can exclude blocks corresponding to files that are irrelevant). However, this generally requires that the operating system directly manage and create snapshots. Because the operating system has limited local resources, this option can be undesirable.

The presently disclosed technology addresses these problems by providing an interface through which a client can specify to a snapshot storage service an ancestral snapshot (also referred to herein as a parent snapshot) of a storage volume, and specify and/or provide individual blocks (or sub-blocks) of the storage volume that have changed relative to the ancestral snapshot. For example, such a client may call an API for creating a snapshot (e.g., of a storage volume of a cloud provider network or of a storage volume outside the cloud provider network such as on-premises of a customer of the cloud provider network) and specify the parent snapshot in the API call. Subsequently, the client can repeatedly call another API for adding blocks (or sub-blocks) to the snapshot. When finished, the client can call yet another API for sealing the snapshot, rendering the snapshot immutable. Thus, the snapshot storage service can create a snapshot based on the blocks or sub-blocks specified/provided by the client, which may not include all the blocks in the storage volume or all the blocks that have changed since the creation of the ancestral snapshot. By allowing the client to specify a parent snapshot to be used for creating the snapshot and/or the blocks (or sub-blocks) to be added to the snapshot, differential snapshots (also referred to herein as incremental snapshots or child snapshots) can be created with only client-specified/provided blocks (or sub-blocks) that have changed relative to a past snapshot (e.g., where the client-specified blocks may exclude blocks (or sub-blocks) that have changed on the disk but are unnecessary to store in the snapshot).

Further, for various purposes such as to create differential or incremental snapshots at the user's request or to provide a list of changed blocks to the user for logging, the snapshot storage service may compute the difference between two snapshots. However, computing the difference by performing a block-by-block data comparison can be time-consuming, especially for snapshots associated with large amounts of data. To address this issue, the present application provides an improved method of storing snapshots in a manner that speeds up the block difference calculation process. For example, at the time of generating a child snapshot based on a parent snapshot, if a block in the child snapshot is not changed with respect to a corresponding block in the parent snapshot, the block is stored such that the block has the same path structure as the corresponding block in the parent snapshot (e.g., stored in the storage directory path having the same name). If a block in the child snapshot has been changed since the creation of the parent snapshot, the block is stored such that the block has a path structure that is different from the corresponding block in the parent snapshot (e.g., stored in the storage directory path having a name different from that storing the corresponding block in the parent snapshot). Thus, the difference can be computed much more quickly by comparing the path structure of the blocks in the two snapshots (e.g., the names of the storage directory paths storing the two blocks), without having to perform a block-level data comparison, thereby reducing the consumption of valuable processing resources.

The aforementioned problems, among others, are addressed in some embodiments by the disclosed techniques for creating and managing snapshots of storage volumes. For example, as described above, the present application provides a snapshot creation process that can create a snapshot based on (i) a specification of a parent snapshot to be used as a basis for a given snapshot, and (ii) a specification of the data blocks to be backed up in the given snapshot. Thus, only data blocks specified by the user need to be retrieved and stored as part of the snapshot, thereby reducing the consumption of valuable network, processor, and storage resources. As another example, as described above, at the time of generating a child snapshot based on a parent snapshot, if a data block in the child snapshot has not been changed with respect to a corresponding block in the parent snapshot, the block may be stored such that the block has the same path structure as the corresponding block in the parent snapshot. If a data block in the child snapshot has been changed since the creation of the parent snapshot, the block may be stored such that the block has a path structure that is different from the corresponding block in the parent snapshot. By doing so, the difference between the two snapshots can be computed much more quickly by comparing the path structure of the blocks in the two snapshots, without having to perform a block-level data comparison, thereby reducing the consumption of valuable processing resources.

As described herein, another aspect of the disclosure relates to identification of metadata for accessing a snapshot block. Generally when a snapshot is created and stored, the snapshot is partitioned into a plurality of logical partitions or objects that are stored on object storage servers. During the initial creation of the snapshot, a "table of contents" or "manifest" file may be written to the object storage servers. A snapshot manifest can be arranged as an ordered list of block indices (e.g., logical blocks of a block storage device forming the basis of the snapshot) and can identify the object on the object storage service that holds data corresponding to that block. A manifest can include additional data regarding each block such as metadata relating to the storage location of the block and a snapshot ID. When a user desires to read or request block of a snapshot stored in the public snapshot service described herein, the user may be required to identify the particular objects storing data of the block. The user may be required to identify specific metadata relating to the storage location of the block to gain access to the snapshot block. For example, the public snapshot service may require metadata such as an access token which may identify or relate to the storage location of the underlying block. Such metadata and location information regarding which object corresponds to a block of a snapshot can be retrieved from the snapshot manifest. However, snapshot manifest files can have large file sizes and thus, the retrieval of a snapshot manifest can congest network bandwidth and cause a bottleneck in snapshot operations describe herein. As an example, each entry of a manifest can be 16 bytes in size and can represent a block of a snapshot stored as a 512 kB object. In the example of a 16 TB snapshot, the manifest can be 512 GB in size. Furthermore, a snapshot of a volume can be sparse (e.g., when not every block of the block storage device forming the basis of a snapshot has data, unwritten blocks may not be reflected in the snapshot), and thus not every block address of a block storage device may be represented in the snapshot manifest. Therefore, there is a need for an optimized mechanism to identify the metadata or the location of an object storing data of a particular block of a block storage device as indicated in the snapshot manifest.

Aspects of the present disclosure relate to implementation of a manifest index which provide a technical solution to the technical problems relating to the manifest described above. Manifest entries can be grouped into logical partitions or "fragments" of M entries, and each fragment of M entries can be associated with an offset. Manifest entries are generally ordered sequentially by block indices, indicating metadata for each block such as a particular object of a snapshot that stores data corresponding to a particular block index in a block storage device from which the snapshot was created. Thus, each fragment can also be associated with a starting block index that indicates the block index of the first entry in each fragment and an ending block index that indicates the block index of the last entry in the fragment. A manifest index can comprise entries indicating the offset and the starting and ending block indices of each fragment of the manifest file, thus associating a particular fragment of a snapshot's manifest to a particular block index in a block storage device from which the snapshot was created. Depending on the selection of fragment size M, a manifest index can be significantly smaller in size than a manifest. When the public snapshot service described herein receives a request to identify the object storing data associated with one or more blocks of a block storage device from which a snapshot was created, the public snapshot service can implement the manifest index to identify information from the fragment of the manifest which corresponds to the requested block. Therefore, network load is reduced since the manifest index obviates the need to retrieve or download the entire manifest index from the object storage servers. In addition, multiple entries or fragments may be identified and retrieved in parallel to improve efficiency of the identification operations.

Generally, block storage devices that store the volumes that are the basis of the snapshots described herein are modified or written to at a minimum granularity, generally referred to as a "block." Accordingly, block storage volumes are typically written to in whole blocks, and operating systems generally do not support modification of block storage volumes on a sub-block granularity. As discussed above, snapshots can be stored as a collection of objects representing blocks of a storage volume. Because the concept of a "block" is a logical abstraction, it is possible that a block size of a snapshot is not equivalent to the block size used by an operating system writing data to the snapshot. This can be particularly true in the case of external workloads (e.g., workloads using block storage volumes stored outside of a cloud provider network, such as on-premises of a customer of the cloud) that create snapshots within the cloud for backup. For example, a snapshot of the volume may be configured such that a single "block" of the snapshot represents 512 k of data. For example, an object storage service storing snapshot blocks may utilize underlying physical storage media that is optimized to be utilized in 512 k blocks. However, a user computing device writing to the snapshot may implement a 4 kB block size. Accordingly, a "block" of the snapshot may represent 128 blocks from the point of view of a writing device. In the case of backing up external workloads to cloud snapshots, this can require the computer hosting the external block storage volume to have to buffer much larger amounts of data than are actually being written in order to send entire snapshot blocks over a network to the snapshotting service. This results in inefficient resource usage of both the external host and the network, in that the host has to request a copy of the entire snapshot block to buffer and modify, and has to store and transmit larger quantities of data than it actually needs to back up.

To address this difference in block size from the point of view of the snapshot and from the point of view of a writing device, embodiments of the present disclosure enable blocks of a snapshot (which would otherwise generally be modifiable only as entire units) to be modified at whatever granularity is desired by a writing device (e.g., the block size utilized by an operating system of that device) using an intermediary, referred to herein as a "public snapshot service" to merge writes from the block device into the snapshot at the sub-block level. Beneficially, by using the intermediary to merge sub-block writes into larger snapshot blocks, the external workloads no longer need to request and buffer such large amounts of data (like the entire snapshot block), and can instead stream the writes to the intermediary for merging into the appropriate place within the snapshot block. In such cases where a block of the snapshot (stored as an object) represents multiple blocks from the point of view of a writing device, a modification made to a single block from the point of view of a writing device can be represented as a modification of only a portion of a block of the snapshot, which portion is generally referred to herein as a "sub-block" of the snapshot.

One potential mechanism for allowing writes on the sub-block level is to completely recreate a written-to snapshot block with each modification of the block. For example, for data written to a portion of a given snapshot block, one approach may be to read the entire snapshot block, apply the written data to the portion of the block, and resave the snapshot block. To ensure no data is lost, the saved snapshot block could be stored as part of a new snapshot (e.g., a child snapshot of the prior parent snapshot). A downside of this technique is that significant data duplication occurs between the newly saved blocks and prior versions of those blocks. For example, where snapshot blocks are 512 kB, a write to a 4 kB portion of the block results in duplication of 508 kB of data. Particularly for large snapshots, this data duplication can result in significant load in terms of storage costs.

Aspects of the disclosure therefore relate to creating snapshots representing modifications made to sub-blocks of a snapshot of a volume. When a modification is made to a sub-block of an existing snapshot (also referred to as a "parent" snapshot), the public snapshot service may initiate creation of a child snapshot to store the modifications made to the sub-block. The public snapshot service may also modify an existing unsealed snapshot to incorporate the modifications made to the sub-blocks without creating a child snapshot. The public snapshot service may prepare a zero buffer that is the size of a snapshot block including the written-to sub-block. A zero-buffer, or buffer object, may be an object with file size of a snapshot block, for example, 512 kB, that comprise zeros as the values. When the public snapshot service receives changes made to one or more sub-blocks of the snapshot block, the public snapshot service can apply the changed sub-blocks of data of the snapshot block held in the buffer. The size of the sub-block can be any portion of the snapshot block. To complete the generation of the child snapshot block, the public snapshot service may encrypt the data of the buffer to generate a snapshot block of the child snapshot. The generated child snapshot block can then be stored as an object on object storage servers, as part of a collection of objects representing the child snapshot. Furthermore, the snapshot service can generate a write-set indicating the sub-block offset, the length, and a checksum of the sub-blocks applied to the child snapshot block. The sub-block offset can indicate the offset of the modified block in the underlying volume reflected in the snapshot. The write-set can be stored on a metadata data store in communication with the public snapshot services or on the object storage servers. The creation of child snapshot blocks from sub-block level changes to a parent snapshot enables the public snapshot service to avoid a replication of an entire snapshot (or even an entire snapshot block) for minor modifications to a backed up volume, thereby reducing network and computing resource burden. In some embodiments, the public snapshot service may represent the modifications as a write representation and merge the parent snapshot with the write representation according to the processes described herein. The public snapshot service may store the resulting snapshot as a child snapshot.

When a user requests a read of a snapshot of volume, the public snapshot service can present to the user the up-to-date snapshot by merging the parent snapshot with subsequently generated child snapshots. In response to receiving a request to read a snapshot, the public snapshot service retrieves the blocks of the parent snapshot from the object storage servers. The public snapshot service can also retrieve the child snapshot blocks and the write-set. For each entry of the write-set, the sub-blocks are retrieved from the corresponding child snapshot. The public snapshot service can use the sub-block offset indicated in the write-set to align and merge the sub-blocks of the child snapshot to the corresponding sub-blocks of the parent snapshot blocks. The merged block can be transmitted in response to the request, or stored as a new snapshot.

These and other aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting.

Overview of Example Computing Environment for Public Snapshot Service

FIG. 1 depicts an example computing environment 100 including an elastic computing system 120 in which the disclosed public snapshot service can be implemented. The elastic computing system 120 may be a cloud provider network (sometimes referred to simply as a "cloud"). The cloud refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load, which provides the "elasticity" of the elastic computing system 120. It will be appreciated that the disclosed snapshot creation and management techniques may be implemented in non-elastic computing environments as well.

The elastic computing system 120 can be accessed by user computing devices 102 over a network 104. The elastic computing system 120 includes one or more block store servers 105, one or more object storage servers 110, and one or more compute servers 115 that are in networked communication with one another and with the network 104 to provide users with on-demand access to computing resources including volumes 106, buckets 111, and instances 116, among others. These particular resources are described in further detail below. Some implementations of elastic computing system 120 can additionally include domain name services ("DNS") servers, relational database servers, and other server configurations (not illustrated) for supporting on-demand cloud computing platforms. Each server includes hardware computer memory and/or processors, an operating system that provides executable program instructions for the general administration and operation of that server, and a computer-readable medium storing instructions that, when executed by a processor of the server, allow the server to perform its intended functions.

The elastic computing system 120 can provide on-demand, scalable computing platforms to users through the network 104, for example allowing users to have at their disposal scalable "virtual computing devices" via their use of the block store servers 105, object storage servers 110, and compute servers 115. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The elastic computing system 120 can be provided across a number of geographically separate regions, for example to provide users with lower latencies by having their virtual computing devices in or near their geographic location. Each region is physically isolated from and independent of every other region in terms of location and power supply, and may communicate data with the other regions through the network 104. Each region can include two or more availability zones each backed by one or more physical data centers provided with redundant and separate power, networking and connectivity to reduce the likelihood of two zones failing simultaneously. While a single availability zone can span multiple data centers, no two availability zones share a data center. This can protect users from data-center level failures. A data center refers to a physical building or enclosure that houses and provides power and cooling to one or more of the block store servers 105, object storage servers 110, and compute servers 115. The data centers within an availability zone and the availability zones within a region are connected to one another through private, low-latency links, for example fiber optic network cables. This compartmentalization and geographic distribution of computing hardware enables the elastic computing system 120 to provide fast service to users on a global scale with a high degree of fault tolerance and stability. To distribute resources evenly across the zones in a given region, the provider of the elastic computing system 120 may independently map availability zones to identifiers for each user account.

Turning specifically to the roles of the different servers within the elastic computing system 120, the compute servers 115 include one or more servers on which provide resizable computing capacity to users for building and hosting their software systems. Users can use the compute servers 115 to launch as many virtual computing environments, referred to as "instances" 116, as they need. Instances 116 can have various configurations of processing power, memory, storage, and networking capacity depending upon user needs. The compute servers 115 can also include computer storage for temporary data used while an instance is running, however as soon as the instance is shut down this data is lost.

The block store servers 105 provide persistent data storage for the compute servers 115 in the form of volumes 106. The block store servers 105 include one or more servers on which data is stored as blocks. A block is a sequence of bytes or bits, usually containing some whole number of records, having a maximum length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. A block of data (also referred to herein as a "data block") can be, for example, 512 bytes, 1 kilobyte ("kB"), 4 kB, 8 kB, 16 kB, 32 kB, 64 kB, 128 kB, 256 kB, 512 kB, or larger, depending upon the implementation. The snapshots described herein may include any number of such blocks. The size of a snapshot may vary, depending for example upon the size of the user volume for which the snapshot is created.

User volumes 106, which can be treated as an individual hard drive ranging for example from 1 GB to 1 terabyte TB (or more) in size, are made of one or more blocks stored on the block store servers 105. Although treated as an individual hard drive, it will be appreciated that a volume may be stored as one or more virtualized devices implemented on one or more underlying physical host devices. Volumes 106 may be partitioned a small number of times (e.g., up to 16) with each partition hosted by a device of the elastic computing system 120 that has the ability to transfer data at around 1 GB per second ("Gbps") in some implementations. These volumes provided persistent, dedicated storage that can be attached to particular instances of the compute servers 115. Each volume may be attached to a single instance running on a compute server 115, and can be detached from that instance and re-attached to another. The block store servers 105 may have built-in redundancy for volumes by replicating the volume across multiple servers within an availability zone, which means that volumes will not fail if an individual drive fails or some other single failure occurs.

The object storage servers 110 represent another type of storage within the elastic computing system 120. The object storage servers 110 include one or more servers on which data is stored as objects within resources referred to as buckets 111. Each object typically includes the data being stored, a variable amount of metadata that enables various capabilities for the object storage servers 110 with respect to analyzing a stored object, and a globally unique identifier or key that can be used to retrieve the object. Objects stored on the object storage servers 110 are associated with a unique identifier, such that authorized access to them can be obtained through requests from networked computing devices in any location. Each bucket 111 is associated with a given user account. Users can store as many objects as desired within their buckets, can write, read, and delete objects in their buckets, and can control access to their buckets and the objects contained therein. Further, in embodiments having a number of different object storage servers 110 distributed across different ones of the regions described above, users can choose the region (or regions) where a bucket is stored, for example to optimize for latency. Users can use object storage servers 110 for purposes such as storing photos on social media websites, songs on music streaming websites, or files in online collaboration services, to name a few examples. Applications developed in the cloud often take advantage of the vast scalability and metadata characteristics of the object storage servers 110. The object storage servers 110 can support highly parallel data accesses and transfers.

The object storage servers 110 can offer even greater redundancy than the block store servers 105, as the object storage servers 110 can automatically replicate data into multiple availability zones. The object storage servers 110 also have different data throughput than the block store servers 105, for example around 20 Mbps for a single stream of data. While the object storage servers 110 can be used independently from the instances 116 and volumes 106 described above, they can also be used to provide data backup as described herein with respect to snapshots (e.g., object-stored backups of volume data).

As illustrated in FIG. 1, the elastic computing system 120 can communicate over network 104 with user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. User computing devices 102 can include any network-equipped computing device, for example desktop computers, laptops, smartphones, tablets, e-readers, gaming consoles, and the like. Users can access the elastic computing system 120 via the network 104 to view or manage their data and computing resources, as well as to use websites and/or applications hosted by the elastic computing system 120.

Example Use Cases of Public Snapshot Service on Elastic Computing System

Figure 2:
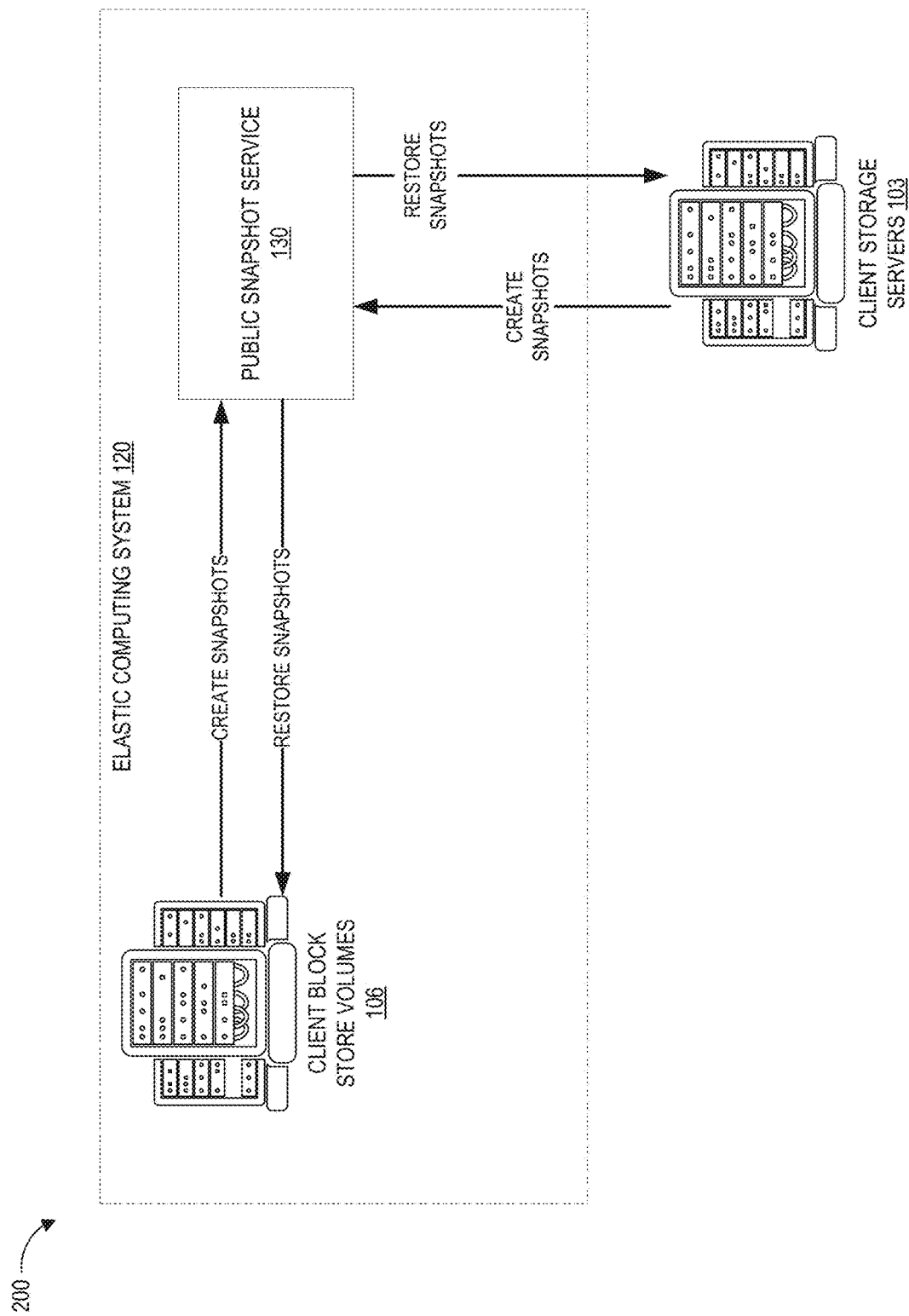
FIG. 2 depicts a schematic diagram of a network environment in which the elastic computing system of FIG. 1 is used to implement a public snapshot service in accordance with aspects of the present disclosure.

FIG. 2 depicts a computing environment 200 in which a public snapshot service 130 is implemented on the elastic computing system 120. Several use cases of the public snapshot service 130 are illustrated in FIG. 2. For example, users can instruct the public snapshot service 130 to create snapshots of their volumes stored on the block store servers 105 (e.g., client block store volumes 106) and/or create snapshots of their volumes stored on their own data storage servers that are external to the elastic computing system 120 (e.g., client storage servers 103). Similarly, users can instruct the public snapshot service 130 to restore previously created snapshots of their volumes (either the client block store volumes 106 or volumes stored on the client storage servers 103) onto their volumes stored on the block store servers 105 (e.g., client block store volumes 106) and/or onto their volumes stored on their own data storage servers that are external to the elastic computing system 120 (e.g., client storage servers 103). Any combinations of creation and restore operations illustrated in FIG. 2 can be performed. For example, (i) a snapshot of a volume stored on the client storage servers 103 can be restored onto a volume stored on the block store servers 105, (ii) another snapshot of a volume stored on the block store servers 105 can be restored onto a volume stored on the client storage servers 103, (iii) yet another snapshot of a volume stored on the block store servers 105 can be restored onto a volume stored on the block store servers 105, and (iv) yet another snapshot of a volume stored on the client storage servers 103 can be restored onto a volume stored on the client storage servers 103.

In one embodiment, a snapshot is a point-in-time block-level backup of the volume, stored as a copy of data on the volume on one or more of the object storage servers 110 (e.g., as a single object or a collection of objects). In addition or as an alternative to managing snapshots through general interfaces for the object storage servers 110, snapshots may be managed through the application programming interface ("API") of the block store servers 105 and/or the API of the public snapshot service 130 implemented on the elastic computing system 120. In one example, snapshots are implemented as incremental records of data within a volume. Illustratively, when the first snapshot of a volume is taken, all blocks of the volume that contain valid data are copied as one or more objects to the object storage servers 110, and then a snapshot "table of contents" or "manifest" file is written to the object storage servers 110 that includes a record of the one or more objects, as well as the blocks of the volume to which each of the one or more objects correspond. Due to the use of incremental snapshots, when the subsequent snapshots are taken of the same volume, only the blocks that have changed since the first snapshot need be copied to the object storage servers 110, and the table of contents or manifest file can be updated to point to the latest versions of each data block (or a second table of contents or manifest file can be created, enabling the initial table of contents or manifest file to remain as a record of a prior version of the volume). An initial snapshot can be used to reconstruct the volume at the time of the initial snapshot, or snapshots from subsequent time points can be combined together or with the initial snapshot to reconstruct the entire volume at any individual subsequent point in time. In this way snapshots can serve as both incremental backups and a full backup of a given volume.

When creating a snapshot, any data written to the volume up to the time the snapshot is started can be included in the snapshot, and users can continue to perform I/O operations to their volumes during snapshot creation without affecting the snapshot. Users can create a new volume from a snapshot, for example to create duplicates of their volumes or to restore data. The new volume will contain all the data stored in the snapshot and thus will be a duplicate of the original volume at the time the snapshot was started. In this manner, snapshots can also be used to transfer a volume's data from one availability zone to another. Similarly, snapshots can be taken of instances to create a new virtual machine instance of that instance.

Overview of Example Public Snapshot Service

Figure 3:
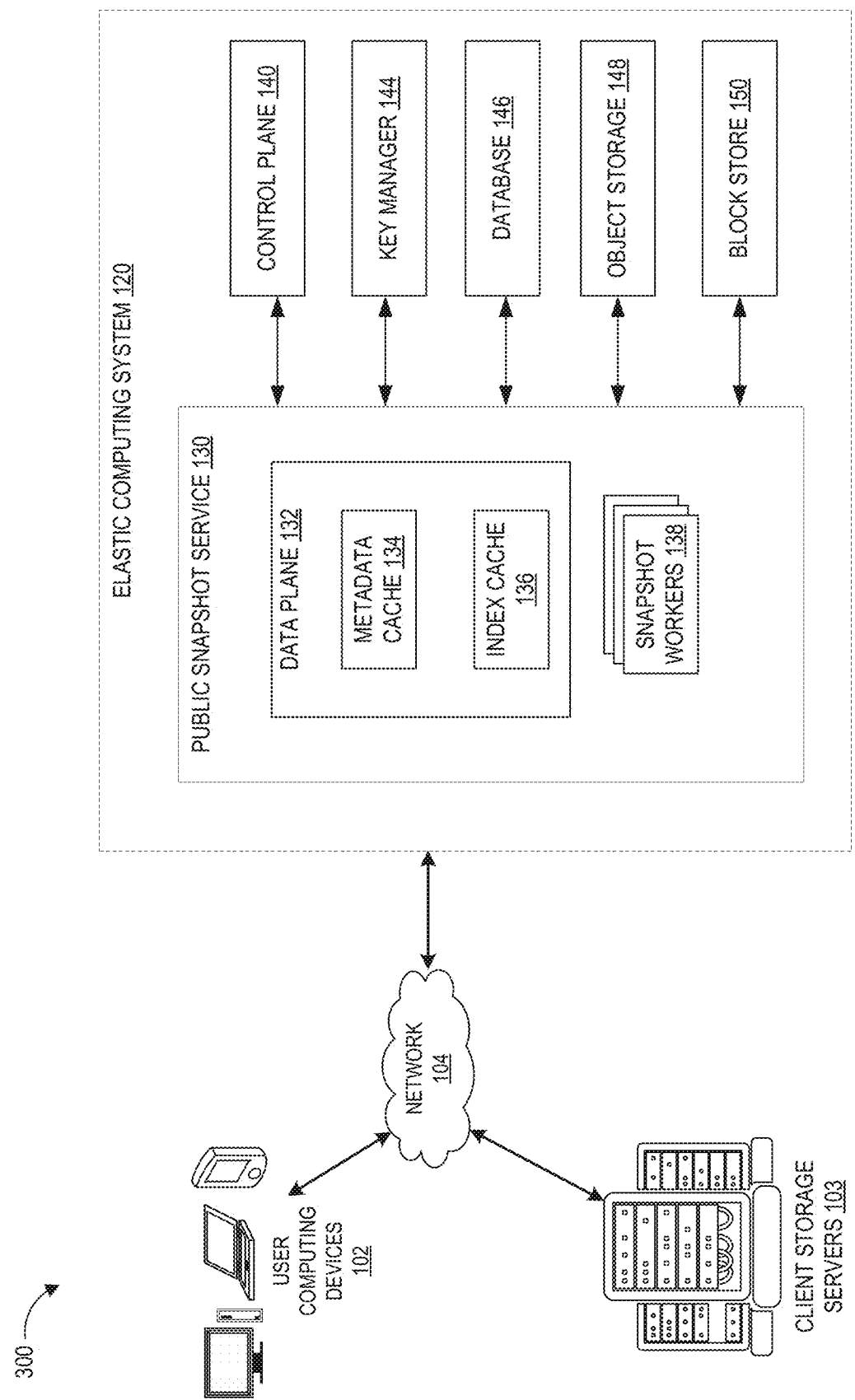
FIG. 3 depicts a more detailed schematic diagram of a network environment in which the elastic computing system of FIG. 1 is used to implement a public snapshot service in accordance with aspects of the present disclosure.

FIG. 3 depicts a more detailed computing environment 300 in which the public snapshot service 130 is implemented on the elastic computing system 120. More specifically, the computing environment 300 includes the user computing devices 102 and the client storage servers 103 in communication with the elastic computing system 120 via the network 104. The public snapshot service 130 as implemented by the elastic computing system 120 of FIG. 3 includes a data plane system 132 and snapshot workers 138. The data plane system 132 further includes a metadata cache 134 and an index cache 136. Additionally, the elastic computing 120 further includes a control plane system 140 in communication with a key manager 144, a database 146, an object storage 148, and a block store 150. For example, the object storage 148 may be implemented by the object storage servers 110 of FIG. 1 and the block store 150 may be implemented by the block store servers 105 of FIG. 1. One or more components of the public snapshot service 130 may be implemented on one or more instances 116 provided by the compute servers 115.

The control plane system 140 provides a set of APIs that can be used by the users of the user computing devices 102 to create and complete snapshots (such as the create snapshot API and complete snapshot API), and the data plane system 132 provides a set of APIs that can be used by the users of the user computing devices 102 to add and read the data blocks in existing snapshots stored on the elastic computing system 120 (such as the add data block API, list snapshot blocks API, list changed blocks API, and get snapshot block API).

When the public snapshot service 130 creates a snapshot, the public snapshot service 130 may store metadata of the blocks being added to the snapshot in the metadata cache. The metadata is used to minimize or reduce the number of control plane calls. Once a snapshot is completed, this metadata may be pruned. The public snapshot service 130 may store the snapshot manifest index in the index cache 136, wherein the snapshot manifest index identifies all the blocks in a snapshot arranged in a specific order. For example, the metadata index may be a lookup table of block indices to offsets mapping in the manifest file. An entry in the metadata index may represent the mapping of block index and offset of the part of the manifest file that starts with the block index.

The snapshot workers 138 may perform one or more operations of the public snapshot service 130 such as building the snapshot using the blocks specified/provided by the user, performing integrity validation, and communicating with other components of the elastic computing system 120.

The key manager 144 may utilize a hardware security module to encrypt and decrypt data provided by the public snapshot service 130. For example, the key manager 144 may communicate with a hardware trusted platform module (TPM) to encrypt the data key provided by the public snapshot service 130. In other cases, the key manager 144 may access a key file that includes one or more keys usable by the key manager 144 to encrypt or decrypt data provided by the public snapshot service 130. The key manager 144 may provide an HTTP API exposed to the public snapshot service 130.

The database 146 can be a database implemented by one or more relational or non-relational database servers of the elastic computing system 120 and may store the records associated with the individual blocks in a snapshot (e.g., indicating the status thereof). Additionally, the database 146 may store the lineage data indicating the parent-child relationships of the snapshots. The object storage 148 can be one or more buckets of the object storage servers 110 described above that includes a snapshot of a volume. The block store 150 can be one or more volumes of the block store servers 105 described above (e.g., virtual disks of a virtual machine instance) for which one or more snapshots are created and/or onto which one or more snapshots can be restored.

Example Snapshot Creation Workflow

Figure 4:
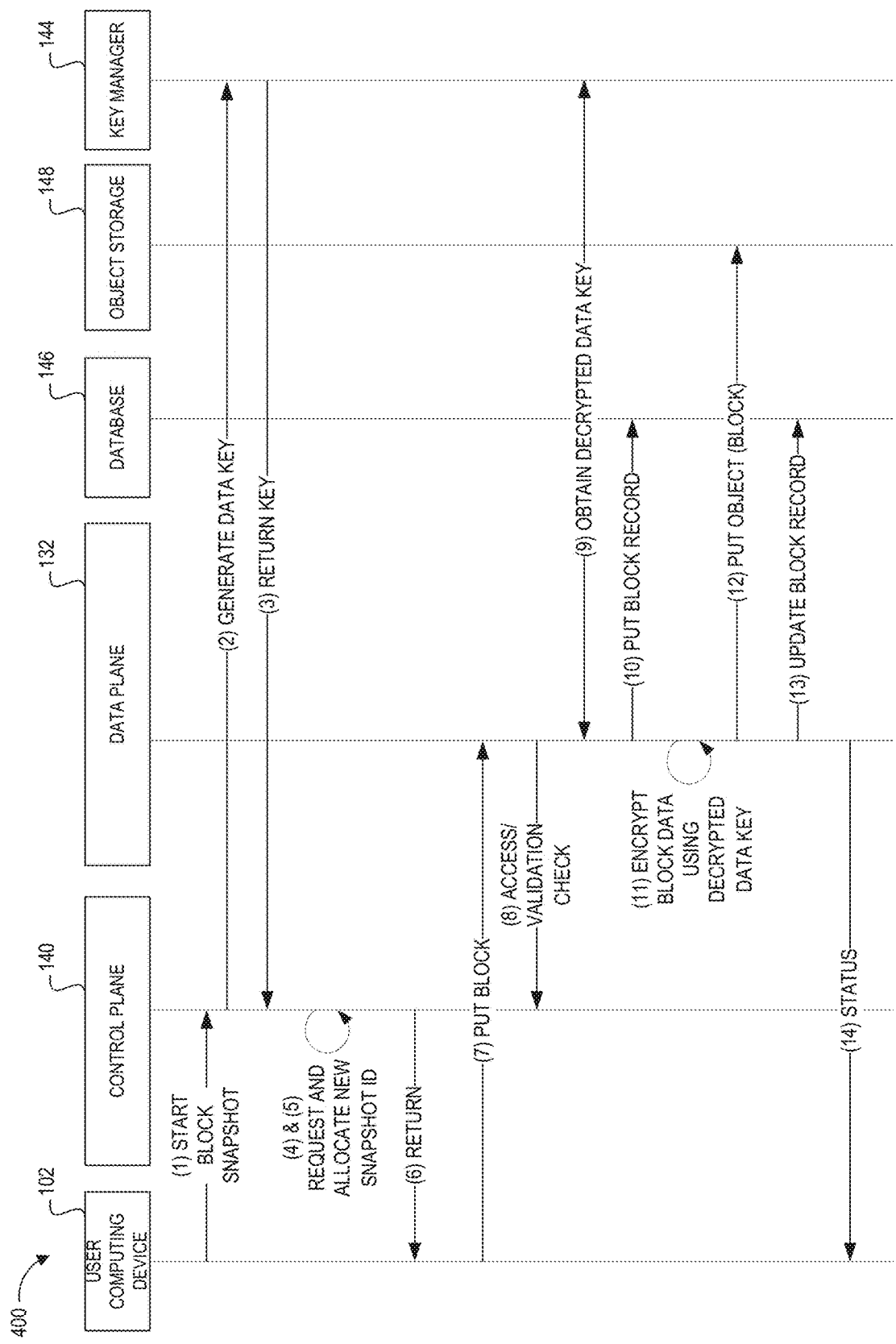
FIG. 4 depicts an example workflow for creating a snapshot within the network environment of FIG. 3 in accordance with aspects of the present disclosure.

FIG. 4 depicts interactions among the various components shown in FIG. 3 in creating a block-level snapshot in accordance with aspects of the present disclosure. As shown in FIG. 4, at (1), the user computing device 102 calls a control plane API to initiate the block snapshot creation process. The API call may specify the parameters to be used for creating a block snapshot such as, for example, (i) the size of the volume for which the block snapshot is to be created, (ii) an indication of any previous/parent snapshot, (iii) a unique token associated with the request (e.g., to ensure idempotency such that a subsequent retry of the request will not create another snapshot), (iv) a key to be used to encrypt the snapshot (if unspecified, a default key or the key that was used to encrypt the previous/parent snapshot may be used), (v) a timeout period after which the request can be canceled if no progress is made, and the like. At (2), the control plane system 140 requests a data key from the key manager 144. At (3), the key manager 144 generates a data key and transmits the generated data key to the control plane system 140. In some embodiments, the request at (1) includes the data key to be used to encrypt the snapshot, and (2) and (3) are omitted. In other embodiments, the request at (1) specifies a previous/parent snapshot, and control plane system 140 determines the data key by identifying the data key that was used to encrypt the previous/parent snapshot. At (4) and (5), the control plane system 140 requests and allocates a new snapshot ID based on the data key obtained from the key manager 144 (or otherwise identified). The allocated snapshot ID can be used by the user computing device 102 to identify the new block snapshot and to perform additional operations with respect to the block snapshot as further illustrated below. At (6), the control plane system 140 returns a response to the user computing device 102. For example, the returned response may include the allocated snapshot ID and other parameters needed to utilize the snapshot such as the block size (size of the blocks in the block snapshot).

At (7), the user computing device 102 calls a data plane API for adding blocks of a storage volume to the snapshot. The data plane API may take as input the snapshot ID created in (1)-(6), block index indicating the location of the data block being added to the snapshot, the data stored in the data block (also referred to herein as block data), the length of the data block, and checksum information. In some embodiments, one or more sub-blocks (along with their offset, data, and length) may be specified in the data plane API call. In some cases, the operating system associated with the storage volume that may track and indicate which blocks of the storage volume should be included in the snapshot (e.g., to ignore changes to unneeded files in the storage volume).

At (8) the data plane system 132 transmits an access and validation check request to the control plane 140 and receives a return response. For example, the checksum information included in the request received at (7) may include a client checksum value, and the control plane 140 may validate the integrity of the block data using the client checksum value. Although not shown in FIG. 4, the client checksum value may be stored in the database 146. In some cases, instead of specifying a full block, the request received at (7) specifies a list of sub-blocks to be part of the full block. The sub-blocks may be validated separately (e.g., using the checksum information included in the request). At block (9), the data plane system 132 obtains a decrypted data key by transmitting a request to decrypt the encrypted data key to the key manager 144 and receiving the decrypted data key in response. At (10), the data plane system 132 transmits a request to the database 146 to create a block record in the database 146 and receives a return response. For example, the block record may indicate the state of the block record is "pending." At (11), the data plane system 132 encrypts the data block with the decrypted data key, to result in an encrypted data block. At (12), the data plane system 132 transmits a request to the object storage 148 to store the encrypted data block in the object storage 148 and receives a return response. Although not shown in FIG. 4, prior to proceeding to (12), the data plane 132 may calculate a checksum of the encrypted data block and determine whether the checksum matches the client checksum value included in the request received at (7). At (13), the data plane system 132 transmits a request to the database 146 to update the block record in the database 146 and receives a return response. For example, the updated block record may indicate the state of the block record is "added." At (14), the data plane system 132 transmits a status to the user computing device 102. For example, the status may indicate that the data block identified at (7) was successfully added to the snapshot. Interactions (7)-(14) of FIG. 4 may be repeated to add additional data blocks to the snapshot.

After all the data blocks have been added, the user computing device 102 may call a control plane API for completing or sealing the snapshot. The control plane API may take as input the snapshot ID, the number of data blocks that have been changed in the snapshot (e.g., this number should match the number of data blocks added in (7)-(14)), and checksum information. The snapshot completion can be started as an asynchronous task and its progress can be tracked with an API by specifying the snapshot ID in the request. During the completion process, the checksum and version information of the added/changed blocks may be checked using the checksum information provided in the request to complete the snapshot. Once the snapshot is completed, the control plane 140 may return a success return value. Prior to the completion of the snapshot, the blocks within the snapshot may not be readable, and requests to read blocks within the snapshot may result in an error. Once the snapshot is successfully sealed, the snapshot may become immutable, additional data blocks may not be able to be added to the snapshot, and the data blocks within the snapshot may become readable.

Example Workflow for Writing Data to Blocks of a Snapshot

Figure 5:
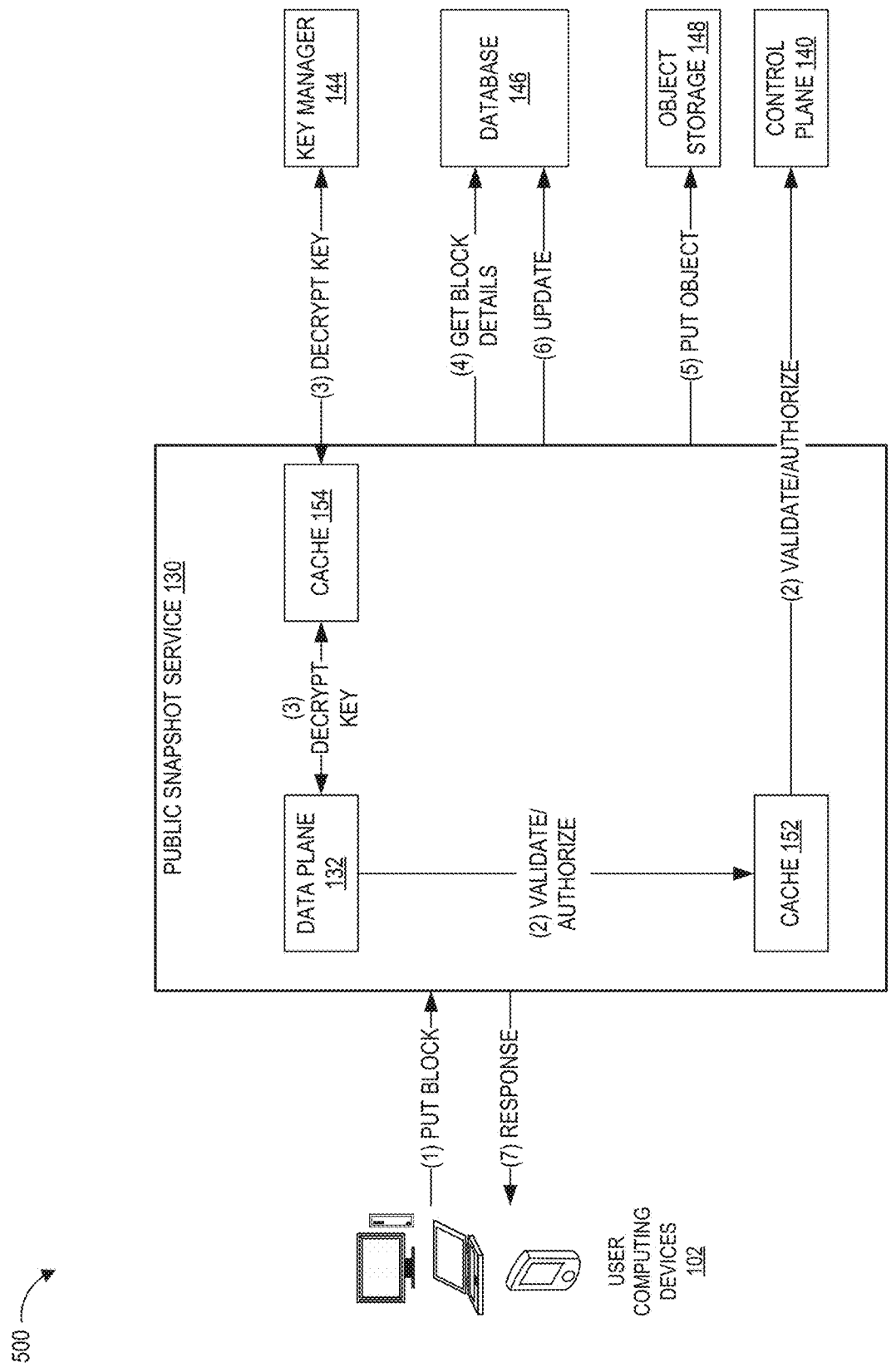
FIG. 5 depicts another example workflow for creating a snapshot within the network environment of FIG. 3 in accordance with aspects of the present disclosure.

FIG. 5 depicts another example workflow for writing data to blocks of a snapshot that has been allocated (e.g., as illustrated in (1)-(6) of FIG. 4). As shown in FIG. 5, at (1), the user computing device 102 sends a request (e.g., in the form of an API call) to the data plane system 132 to add data to a block of the snapshot by specifying the snapshot ID associated with the snapshot (e.g., one that was created prior to the request at (1) but not yet sealed or completed) along with the block index indicating the location of the data block being added to the snapshot, the block data, the length of the data block, and checksum information. In some embodiments, writes may occur at a sub-block level, as discussed in more detail below with respect to FIG. 14. At (2), the data plane system 132 checks if the validation/authorization information necessary to validate/authorize the request from the user computing device 102 is stored in the cache 152. If so, the data plane system 132 validates/authorizes the request using the information. If not, the data plane system 132 transmits a validation/authorization request to the control plane 140. After validating/authorizing the request, the data plane system 132 checks if the cache 154 stores the decrypted data key usable by the data plane system 132. If so, the data plane system 132 uses the decrypted key stored in the cache 154. If not, at (3) the data plane system 132 requests the decrypted data key from the key manager 144 and receives the decrypted key. At (4), the data plane system 132 transmits a request to the database 146 to create a block record in the database 146 and receives a return response. For example, the block record may indicate the state of the block record is "pending." At (5), the data plane system 132 encrypts the data block with the decrypted data key, and at (6), transmits a request to the object storage 148 to store the data block in the object storage 148 and receives a return response. At (7), the data plane system 132 transmits a request to the database 146 to update the block record in the database 146 and receives a return response. For example, the updated block record may indicate the state of the block record is "added." At (7), the data plane system 132 returns a response to the user computing device 102. For example, the returned response may indicate that the data block identified at (1) was successfully added to the snapshot. Interactions (1)-(7) of FIG. 5 may be repeated to add additional data to blocks of the snapshot.

Figure 6:
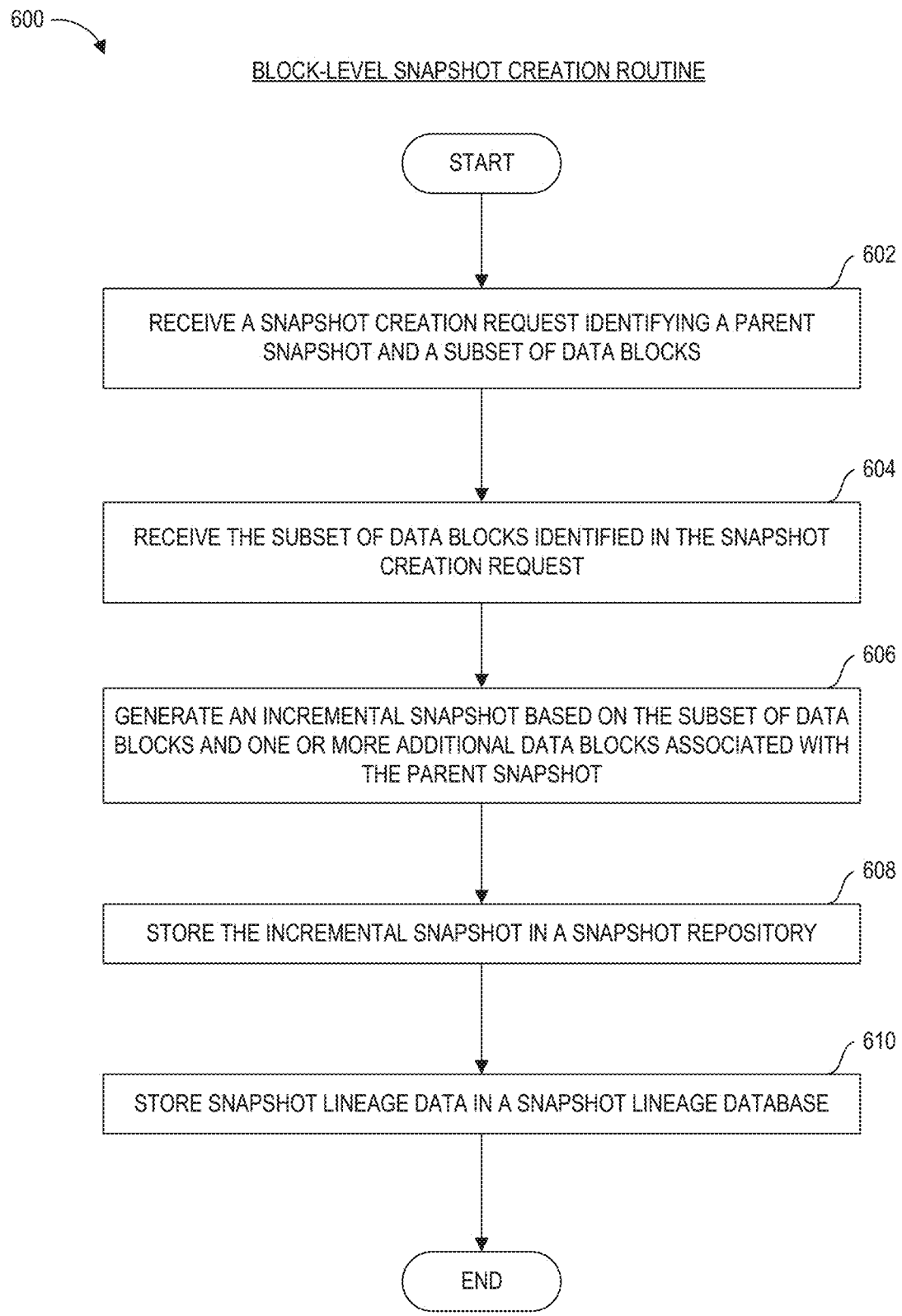
FIG. 6 is a flowchart of an example process for creating a snapshot in accordance with aspects of the present disclosure.

Example Routine for Creating a Snapshot Based on Lineage and Difference Information As illustrated in FIGS. 4 and 5, a block snapshot can be created from volumes stored on the elastic computing system 120 or on-premises volumes by calling the snapshot creation API. In response, the public snapshot service 130 can generate the encryption parameter for the snapshot and pass those parameters to the block store 150 to generate a new snapshot ID. Upon a successful response from the block store 150, the public snapshot service 130 can return the response of the snapshot creation API that may include the allocated snapshot ID, block size, etc. The user computing device 102 (or applications running thereon) can then repeatedly (in sequential or parallel workflows) call the add data block API to add the data blocks into the snapshot. After all changed blocks have been added to the snapshot, the user computing device 102 (or applications running thereon) can seal the snapshot by calling the complete snapshot API. The public snapshot service 130 (or the control plane system 140) can then initiate an asynchronous task to validate and seal the snapshot. With reference to FIG. 6, the snapshot creation process is described in greater detail.

FIG. 6 depicts an illustrative routine 600 for creating a block-level snapshot in accordance with aspects of the present disclosure. The routine 600 may be carried out, for example, by the public snapshot service 130 or one or more other components of the elastic computing system 120 described herein. For convenience, the steps of routine 600 are described as being performed by a public snapshot server. For example, such a public snapshot server may include one or more hardware computing devices and non-transitory physical computer storage storing instructions that, when executed by the one or more hardware computing devices, cause the one or more hardware computing devices to perform the steps of the routine 600.

The routine 600 begins at 602, wherein the public snapshot server receives a snapshot creation request to create an incremental snapshot of a storage volume, where the storage volume is implemented by a client data storage server and stores a plurality of data blocks. The client data storage server may be external to the elastic computing system 120 and in networked communication with the elastic computing system 120 (e.g., via the network 104). Alternatively, the snapshot creation request may be for a storage volume implemented by the elastic computing system 120 such as the volume 106.

The snapshot creation request may identify a parent snapshot stored in a snapshot repository in networked communication with the public snapshot server. The parent snapshot may represent a prior state of the storage volume (e.g., the state of the storage volume at the time the parent snapshot was created, which may be different from the current state of the storage volume). In some cases, the parent snapshot identified in the request is an immediate parent snapshot of the snapshot currently being created. In other cases, the parent snapshot identified in the request is a more distant parent snapshot, where one or more snapshots of the storage volume have been created between the time at which the parent snapshot was created and the time at which the current snapshot is being created.

The snapshot creation request may also identify a subset of data blocks of the plurality of data blocks stored in the storage volume. For example, of the 200 data blocks stored in the storage volume, the snapshot creation request may indicate only data blocks 51-100 should be included in the snapshot. The request may be submitted, for example, by a user through an API of the public snapshot service 130.

At block 604, the public snapshot server receives, from the client data storage server, the subset of data blocks identified in the snapshot creation.

At block 606, the public snapshot server generates the incremental snapshot based on the subset of data blocks received from the client data storage server and one or more additional data blocks associated with the parent snapshot. By doing so, the public snapshot server may generate the incremental snapshot without accessing all of the data blocks in the storage volume for which the incremental snapshot is created. For example, each block in the incremental snapshot may be represented using its storage location (e.g., in the object storage 148), the snapshot ID (e.g., ID of the parent/ancestor snapshot if a reference to the parent/ancestor snapshot was made, or ID of the current snapshot if the data block has been uploaded for the first time or if the data block was previously uploaded but a reference to the corresponding parent/ancestor snapshot was not made), and a block index (e.g., representing the logical position of the current block in the storage volume). Thus, if a data block is part of both the parent snapshot and the incremental snapshot referring back to the parent snapshot, the data block may be represented as having the same storage location (e.g., in the object storage 148) in both the parent snapshot and the incremental snapshot. The public snapshot server may determine, based on the block index associated with the block provided in the request to add the block to the incremental snapshot, which blocks in the incremental snapshot should be derived from the parent/ancestor snapshot. The public snapshot server, by allowing the snapshot creation request to specify a parent snapshot, eliminates the need to access and store data blocks that are part of the parent snapshot again in the incremental snapshot, thereby reducing the amount of computing resources consumed by the creation of the incremental snapshot.

At block 608, the public snapshot server causes the incremental snapshot to be stored in the snapshot repository. For example, the public snapshot server may store the incremental snapshot in the object storage 148 described herein. Before or after the incremental snapshot is stored in the object storage 148, the incremental snapshot may undergo a sealing process. After all of the blocks within the incremental snapshot have been submitted, the client computing device may provide a manifest of the blocks in the incremental snapshot, and the public snapshot server may use the manifest to validate the blocks that have been added to the incremental snapshot (in addition to or alternative to other integrity checks such as one that uses the checksum information provided by the client computing device). A snapshot manifest provided by the client computing device may contain the references to all blocks for the incremental snapshot. In some cases, the manifest includes references to data chunks or blocks in one or more ancestor snapshots in the lineage. After all of the blocks within the incremental snapshot have been validated according to the manifest, the sealing process ends, and the incremental snapshot becomes immutable and readable. Alternatively, in some embodiments, such a manifest is not provided by the client computing device, and is instead generated by the public snapshot server upon successful completion of the incremental snapshot. In such embodiments, the snapshot sealing process may involve other types of integrity checks (e.g., checksum).

While shown in FIG. 6 as a single series of operations, blocks 604-608 may be repeated multiple times, each repetition receiving a block of the subset of data blocks, updating the incremental snapshot, and storing the updated snapshot. For example, the public snapshot server may receive repeated calls to the add data block API provided by the public snapshot server (e.g., as illustrated in FIGS. 4 and 5).

At block 610, the public snapshot server causes the snapshot lineage data stored in the snapshot lineage database to be updated to reflect a lineage between the parent snapshot and the incremental snapshot. For example, the public snapshot server may store the snapshot lineage data in the database 146 described herein. The routine 600 may then end.

In the example of FIG. 6, the public snapshot server enables a user to write blocks directly into the snapshot by submitting an API call for each block to be added to the snapshot. By doing so, the public snapshot server allows the user to determine which blocks of the parent/ancestor snapshot he or she wishes to keep and which blocks of the parent/ancestor snapshot he or she wishes to overwrite, giving the user the freedom to inherit blocks from the parent/ancestor snapshot even if those blocks have changed since the creation of the parent/ancestor snapshot in the event that such blocks are not important to the user, thereby resulting in computing resource savings. Since the API would rely on the user to indicate which new blocks will be added to the incremental snapshot and which previously-stored blocks will be inherited from the parent/ancestor snapshot(s), the user may need to keep track of the changes that have been made to the current volume (for which the incremental snapshot is to be created) relative to the parent/ancestor snapshot(s). Additionally, by allowing the user to specify the blocks that the user wishes to add to the incremental snapshot, the public snapshot server does not need to perform time-consuming block comparisons in order to determine which blocks have been changed relative to the parent/ancestor snapshot.

Additionally, in some cases, the user may wish to write "null" data to a block in the incremental snapshot (e.g., in a case where the user does not wish the block to be inherited from the parent/ancestor snapshot but the block does not contain any meaningful data). In such cases, rather than writing null data to the block and storing it in the object storage, the public snapshot server may indicate that the block is null (or contains null data). By doing so, the public snapshot server can realize further computing resource savings by not having to store a null block in the object storage. For example, the user may indicate that the block contains null data or the public snapshot server may determine, based on the block data provided by the user, determine that the block contains null data.

Although not illustrated in FIG. 6, the public snapshot server can cause the incremental snapshot to be restored onto one or more storage volumes implemented by the client data storage server (e.g., one that is external to the elastic computing system 120) or cause the incremental snapshot to be restored onto one or more storage volumes implemented by a block store server different from the client data storage server (e.g., a storage volume implemented by the elastic computing system 120 such as the volumes 106).

Example Routine for Generating a Snapshot Storage Path Structure

For various purposes such as for creating incremental snapshots or for tracking changed blocks over time, a system may compute the difference between two snapshots. However, computing the difference by performing a block-by-block data comparison can be time-consuming, especially for snapshots associated with large amounts of data. To address this issue, techniques described herein provide an improved method of storing snapshots in a manner that speeds up the block difference calculation process. For example, at the time of generating a child snapshot based on a parent snapshot, if a block in the child snapshot is not changed with respect to a corresponding block in the parent snapshot, the block is stored such that the block has the same path structure as the corresponding block in the parent snapshot. If a block in the child snapshot has been changed since the creation of the parent snapshot, the block is stored such that the block has a path structure (e.g., a storage directory path in the object store) that is different from the corresponding block in the parent snapshot. Thus, the difference can be computed much more quickly by comparing the path structure of the blocks in the two snapshots, without having to perform a block-level data comparison, thereby reducing the consumption of valuable processing resources. Such techniques are described in greater detail below with reference to FIG. 7.

Figure 7:
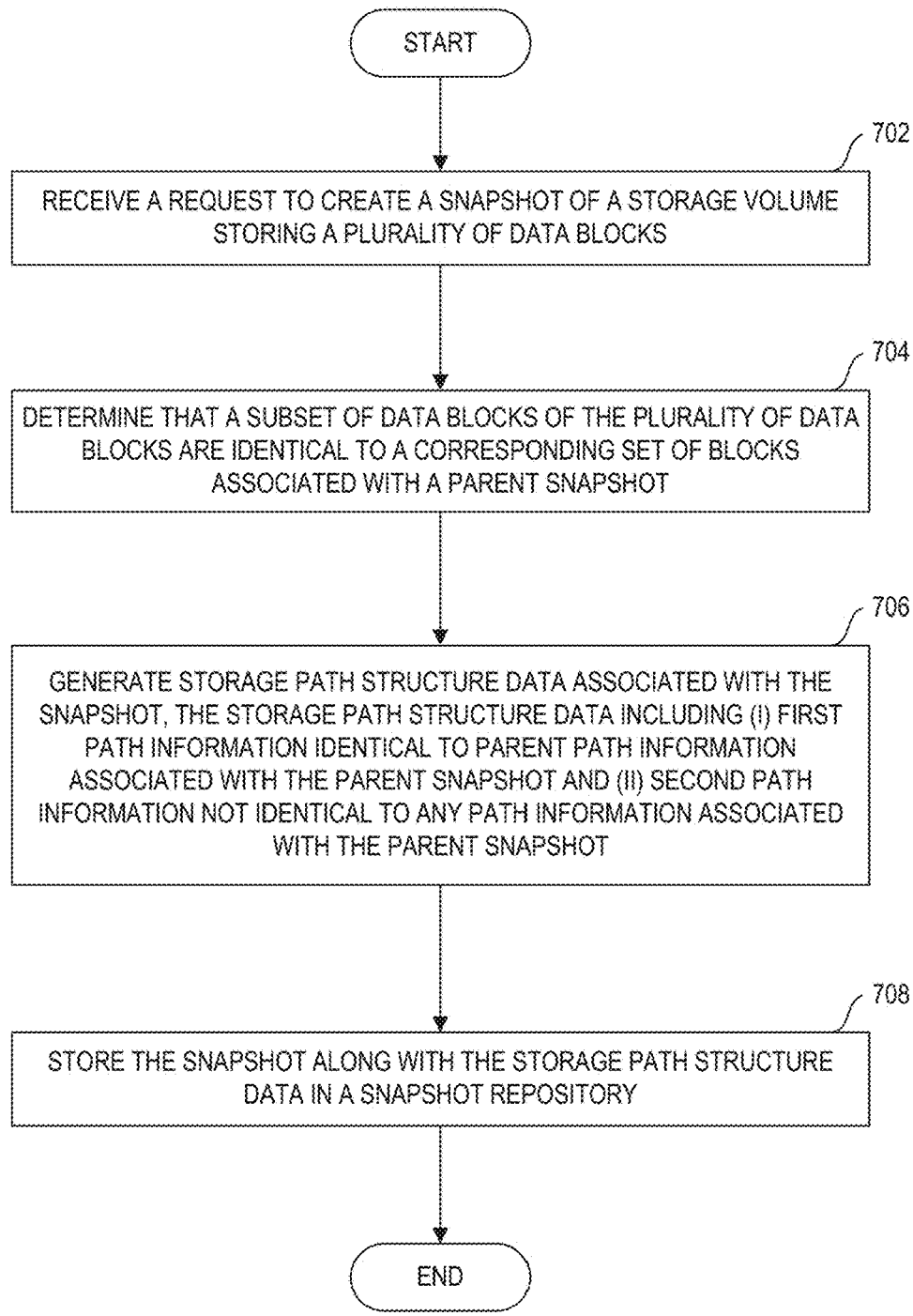
FIG. 7 is a flowchart of an example process for generating snapshot storage path structure data in accordance with aspects of the present disclosure.

FIG. 7 depicts an illustrative routine 700 for generating a snapshot storage path structure in accordance with aspects of the present disclosure. The routine 700 may be carried out, for example, by the public snapshot service 130 or one or more other components of the elastic computing system 120 described herein. For convenience, the steps of routine 700 are described as being performed by a public snapshot server. For example, such a public snapshot server may include one or more hardware computing devices and non-transitory physical computer storage storing instructions that, when executed by the one or more hardware computing devices, cause the one or more hardware computing devices to perform the steps of the routine 700.

The routine 700 begins at 702, wherein the public snapshot server receives a snapshot creation request to create an incremental snapshot of a storage volume storing a plurality of data blocks. The storage volume may be associated with a parent snapshot that was previously created and stored in a snapshot repository in networked communication with the public snapshot server. The parent snapshot may represent a prior state of the storage volume (e.g., the state of the storage volume at the time the parent snapshot was created, which may be different from the current state of the storage volume). The request may be submitted, for example, by a user through an API of the public snapshot service 130.

At block 704, the public snapshot server determines that a subset of data blocks of the plurality of data blocks stored in the storage volume are identical to a corresponding set of data blocks associated with the parent snapshot. For example, the public snapshot server may determine that the subset of data blocks are identical based on an identification of the subset of data blocks provided by a user of the public snapshot server, without performing a block-by-block data comparison between the parent snapshot and the incremental snapshot. Alternatively, the public snapshot server may determine that the subset of data blocks are identical based on a block-by-block data comparison between the parent snapshot and the incremental snapshot.

At block 706, the public snapshot server generates first storage path structure data associated with the incremental snapshot, wherein the first storage path structure data includes (i) first path information associated with the subset of data blocks and (ii) second path information associated with one or more additional data blocks of the plurality of data blocks, wherein the first path information is identical to parent path information associated with the corresponding set of data blocks associated with the parent snapshot, and the second path information is not identical to any path information associated with the parent snapshot. In some embodiments, the storage path structure data of a given snapshot may be a list of storage directory paths corresponding to the set of data blocks associated with the given snapshot. For example, the parent snapshot may include 3 data blocks, and the storage path structure data of the parent snapshot may include "path://snapshots/snapshot-id-2/block-1", "path://snapshots/snapshot-id-2/block-2", and "path://snapshots/snapshot-id-2/block-3" for the 3 data blocks, respectively. In the same example, the incremental snapshot includes the same 3 data blocks, but the data in the third data block has changed. The storage path structure data of the incremental snapshot may include "path://snapshots/snapshot-id-2/block-1", "path://snapshots/snapshot-id-2/block-2", and "path://snapshots/snapshot-id-2/block-3-1", respectively. In this example, the storage paths "path://snapshots/snapshot-id-2/block-1" and "path://snapshots/snapshot-id-2/block-2" of the incremental snapshot are found in the storage path structure data of the parent snapshot. On the other hand, the storage path for the third data block, "path://snapshots/snapshot-id-2/block-3-1" is not found in the storage path structure data of the parent snapshot. As described in greater detail with reference to FIG. 8, the public snapshot server may quickly determine which data blocks of the incremental snapshot represent changed data blocks with respect to the parent snapshot by determining, for each respective data block in the incremental snapshot, whether the path information of the respective data block is found in the storage path structure data of the parent snapshot, without performing a block-by-block data comparison for all the data blocks in the incremental snapshot.

At block 708, the public snapshot server causes the incremental snapshot to be stored in the snapshot repository along with the first storage path structure data. In some embodiments, the incremental snapshot is stored in the same storage device as the first storage path structure data. In other embodiments, the incremental snapshot is stored in a storage device separate from the storage device in which the first storage path structure data is stored. The routine 700 may then end.

Although not illustrated in FIG. 7, the public snapshot server can cause the incremental snapshot to be restored onto one or more storage volumes implemented by the client data storage server (e.g., one that is external to the elastic computing system 120) or cause the incremental snapshot to be restored onto one or more storage volumes implemented by a block store server different from the client data storage server (e.g., a storage volume implemented by the elastic computing system 120 such as the volumes 106).

Example Routine for Computing Snapshot Block Difference

Users of the public snapshot service 130 may request the difference between two snapshots, for example by calling a snapshot difference API and specifying the IDs of the two snapshots. In response the public snapshot service 130 may return a list of changed data blocks. By storing the data blocks of a snapshot in a specific storage path structure described with reference to FIG. 7, the difference can be computed much more quickly by comparing the path structure of the data blocks in the two snapshots, without having to perform a block-level data comparison, thereby reducing the consumption of valuable processing resources. The snapshot block difference computation routine is described in greater detail below with reference to FIG. 8.

Figure 8:
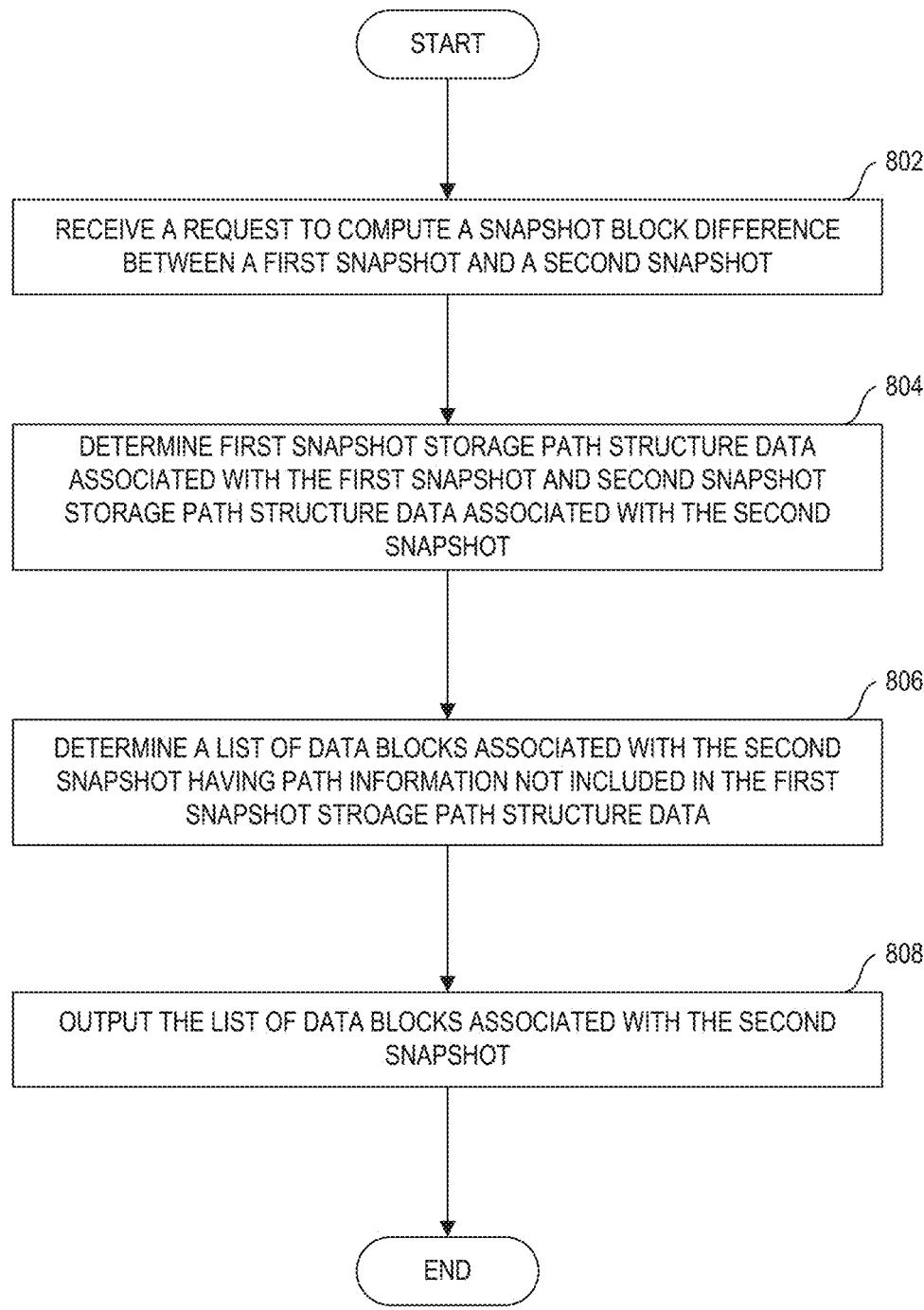
FIG. 8 is a flowchart of an example process for computing a snapshot block difference between two snapshots in accordance with aspects of the present disclosure.

FIG. 8 depicts an illustrative routine 800 for computing the snapshot block difference between two snapshots in accordance with aspects of the present disclosure. The routine 800 may be carried out, for example, by the public snapshot service 130 or one or more other components of the elastic computing system 120 described herein. For convenience, the steps of routine 800 are described as being performed by a public snapshot server. For example, such a public snapshot server may include one or more hardware computing devices and non-transitory physical computer storage storing instructions that, when executed by the one or more hardware computing devices, cause the one or more hardware computing devices to perform the steps of the routine 800.

The routine 800 begins at 802, wherein the public snapshot server receives, from a user computing device 102, a request to compute a snapshot block difference between a parent snapshot and an incremental snapshot. Although referred to herein as a parent snapshot and an incremental snapshot, these snapshots can be any two snapshots stored on the public snapshot server. Illustratively, snapshot lineage may be represented as a tree, with a root snapshot indicating a snapshot without prior lineage, incremental snapshots created from the root snapshot being child nodes of the root snapshot, further incremental snapshots being children of those child nodes, etc. In some embodiments, the two snapshots compared via the routine 800 have a parent-child relationship. In some of such embodiments, the parent snapshot identified in the request is an immediate parent snapshot of the other snapshot identified in the request. In other embodiments, the parent snapshot identified in the request is a more distant parent snapshot of the other snapshot identified in the request, where one or more snapshots of the same storage volume have been created between the time at which the parent snapshot was created and the time at which the other snapshot identified in the request was created. In another embodiment, two of the snapshots compared in routine 800 may be "sibling" or "cousin" snapshot—two snapshots that share a common ancestor snapshot within a lineage tree. Thus, reference to "parent" and "child" snapshots in FIG. 8 should be understood to refer to one example comparison that may be conducted via the routine 800. The request may be submitted, for example, by a user through an API of the public snapshot service 130.

At block 804, the public snapshot server generates a list of data blocks that are each associated with path information not included in the parent path information associated with the parent snapshot. For example, the public snapshot server may generate the list of data blocks by determining, for each respective data block associated with the incremental snapshot, whether the path information associated with the respective data block is included in the parent path information associated with the parent snapshot, and identifying a set of data blocks whose path information is not included in the parent path information. For example, the parent snapshot may have a storage path structure that includes "path://snapshots/snapshot-id-2/block-1", "path://snapshots/snapshot-id-2/block-2", and "path://snapshots/snapshot-id-2/block-3", respectively, for the 3 data blocks in the parent snapshot, respectively, and the incremental snapshot may have a storage path structure that includes "path://snapshots/snapshot-id-2/block-1", "path://snapshots/snapshot-id-2/block-2", and "path://snapshots/snapshot-id-2/block-3-1", respectively, for the 3 data blocks in the parent snapshot. In this example, the public snapshot server may determine that the third block of the incremental snapshot having the path information "path://snapshots/snapshot-id-2/block-3-1" has changed and output the third block, based on the path information "path://snapshots/snapshot-id-2/block-3-1" not being in the storage path structure of the parent snapshot.

At block 806, the public snapshot server outputs the list of data blocks for presentation on the user computing device. The routine 800 may then end.

Example Snapshot Manifest and Manifest Index

Figure 9:
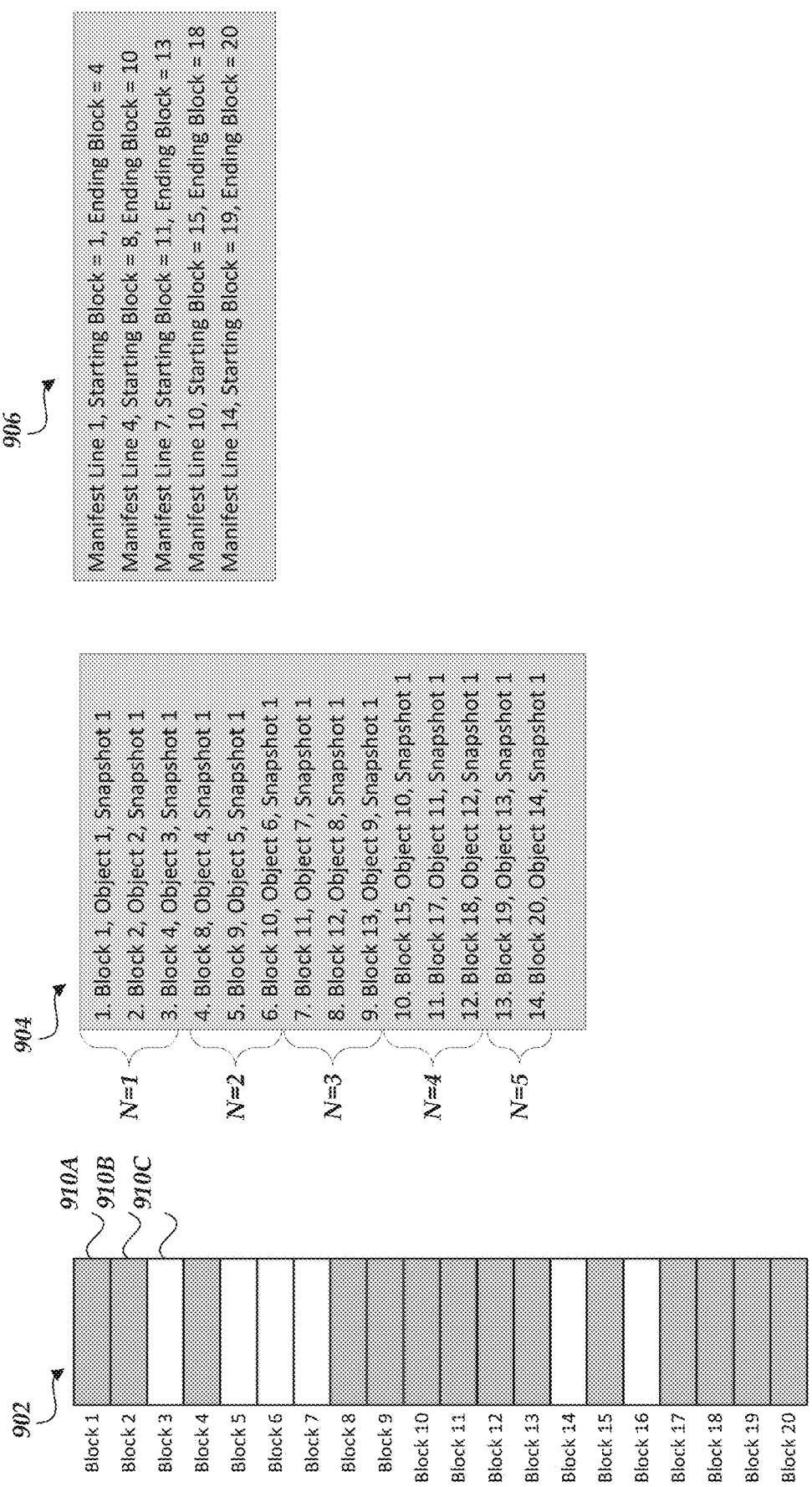
FIG. 9 depicts an example volume, snapshot manifest, and manifest index in accordance with aspects of the present disclosure.

FIG. 9 depicts an example snapshot manifest 904 and a corresponding manifest index 906 that represent a snapshot of a volume 902 representing a block storage device. It should be understood that these depictions of the volume, manifest, and manifest index are only one example implementing one or more aspects of the present disclosure. While the volume 902 is depicted to be comprised of 20 blocks, a person skilled in the art would understand that the snapshot can have more or less than 20 blocks. Similarly, though FIG. 9 depicts the entries of the snapshot manifest 904 and manifest index 906 as comma separated values or expressions, a person of the ordinary skill in the arts would understand that the entries can be implemented in other ways such as the entries represented in binary, the entries as entries of a database structure, key-value data, look-up table, and the like.

FIG. 9 depicts a volume 902 that comprise 20 blocks including blocks 910A, 910B, 910C. Each block such as blocks 910A, 910B, 910C can be logical segments of a volume 902, representing an illustrative block storage device. A block of a volume 902 can be associated with a block index or identifier representing, for example, a logical block address of the volume. As depicted in FIG. 9, the blocks of volume 902 have block indices 1-20. While a sequence of consecutive numeral indices is show in FIG. 9, other sequences are possible, such as non-consecutive integer sequences, sequences starting at an integer other than 1, or non-numeric sequences (e.g., alphabetical sequences). A volume 902 and accordingly, the resulting snapshot of the volume 902 can be sparse, meaning that some partitions, or blocks, of the volume 902 do not have written data. In FIG. 9, blocks of the volume 902 with written data such as blocks 910A and 910B are shaded gray. Blocks without written data such as block 910C are unshaded.

A snapshot is logically portioned into objects such that an object of a snapshot corresponds to one or more blocks of the volume. Generally described, a snapshot manifest 904 enumerates the blocks of a volume 902 and the particular objects of the snapshot that store data corresponding to those blocks. The snapshot manifest 904 may additionally contain metadata relating to the storage location of the objects that store data corresponding to snapshot blocks. As depicted in FIG. 9, a snapshot may exclude blocks of volume 902 without written data and accordingly, the snapshot manifest 904 may exclude blocks such as block 910C without written data and enumerate only the blocks with written data. The snapshot manifest 904 may enumerate the blocks in sequential order according to the block indices, for example, in ascending order. While each block of a volume 904 in FIG. 9 is associated with a single object, in some cases a single object of a snapshot may store information regarding multiple blocks of a volume. In FIG. 9, each row of the snapshot manifest 904 represents an entry of the snapshot manifest 904. Each entry of the snapshot manifest 904 is enumerated by entry number (manifest entries 1-14 in FIG. 9). Each entry of the snapshot manifest 904 can indicate a block index, the object in which data of the block is stored, and the snapshot ID to which the object belongs. For example, in FIG. 9, the first entry indicates Block 1 of Snapshot 1 which is stored within Object 1. As another example, the fourth entry indicates Block 8 of Snapshot 1 which is stored within Object 4. The block index, objects, and snapshot ID may be indicated as integers, hexadecimals, string expressions, or the like. In some instances, an object identifier may include a prefix identifier indicating the top level logical path the object storage server in which the object is stored. The entry may contain additional information such as prefix, the address within the logical path of an object containing the block, filepath data, checksum of the object data, sub-block or block metadata for blocks within the object, object metadata (e.g., an access token algorithmically linked to a storage location of the object storing data of a block, as described below), or the like. An entry of the manifest 904 can be 8 kB, 16 kB, 32 kB, 100 kB, 1 MB, or the like. The snapshot manifest 904 may be stored on the object storage servers 110 upon creation of the snapshot and may be modified in response to snapshot operations described herein.

The snapshot manifest 904 can be logically partitioned into "fragments" of M entries. The last fragment may have less than M entries, depending on how many total entries make up the snapshot manifest 904. The size of the manifest index 906 is inversely proportional to M. In other words, a large M can be selected to reduce the size of the manifest index 906. In turn, the manifest partitions or fragments have more entries, and thus, process 1200 of identifying location of a snapshot block may require a download or retrieval of a larger manifest fragment and more computations to search the fragment for the requested block. The fragment size M can be selected in configuring the public snapshot service, or may be specified on a per-customer basis by a customer generating a snapshot. The fragment size M can be determined according to an optimization scheme to balance manifest index size, bandwidth and storage requirements, and desired search speed. For example, a larger M may result in a smaller manifest index that is more quickly scanned, but larger manifest partitions which are more slowly scanned. Conversely, a smaller M may result in larger manifest index that is more slowly scanned, but smaller manifest partitions which are more quickly scanned. In one embodiment, the fragment size M can be determined according to the size of the volume or snapshot; a larger volume can have larger M and smaller volume can have smaller M. In FIG. 9, fragment size M is 3 entries, and thus each fragment N=1 to N=4 has 3 entries. The last entry N=5 has 2 entries. Each fragment of the manifest can be associated with an offset indicating the position of the fragment with respect entries within the snapshot manifest 904. For instance, a fragment with offset N comprises of the entries in position ((N−1)×M+1) to position (N)×M If the fragment is the last fragment of the snapshot manifest 904 and has less than M entries, the entries comprise the entries in position ((N−1)×M+1) to the last entry of the snapshot manifest 904. The offset of a manifest entry can illustratively refer to the line of the manifest where the entry is positioned. In such case, as depicted in FIG. 9, the offset of the manifest entry pertaining to Block 8 is 4.

In FIG. 9, each entry of the manifest index 906 contains an entry indicating the offset of a fragment in the manifest (e.g., as a line number), the starting block associated with the fragment and the ending block associated with the fragment. Thus, for the example snapshot manifest 904 depicted in FIG. 9, the manifest index 906 can contains 5 entries, one for each fragment N=1 to N=5. Illustratively, the starting block for fragment N=2, starting at manifest line 4, is Block 8, the block associated with the first entry of fragment N=2 as enumerated in the snapshot manifest 904 in FIG. 9. The ending block for the fragment N=2 is Block 10. The offset and starting and ending blocks may be indicated as integers, hexadecimals, string expressions, or the like. An entry of the manifest index 906 can be 4B, 8B, 16B, 100B, 1 kB, 8 kB, 16 kB, 32 kB, 100 kB, 1 MB, or the like.

While entries within the manifest index are shown in FIG. 9 as reflecting offsets of the manifest fragments, in some instances entries in the manifest index may additionally or alternatively reflect a logical position of a fragment among other fragments. For example, a first entry may indicate fragment N=1, a second entry may indicate fragment N=2, etc. As shown above, logical fragment numbers and the offset of such fragment within the manifest may be mathematically derived from one another.

In some embodiments, each entry within manifest index 906 may further indicate a checksum value of manifest fragment (or information within that fragment, such as block indices) associated with the entry, for verifying fragments of the manifest 904 retrieved or downloaded from the object storage servers 110.

The manifest index 906 may be stored on the object storage servers 110 upon creation of the snapshot and may be modified in response to snapshot operations described herein. The manifest index 906 may be retrieved and cached into local memory of the public snapshot service in response to the first operation on a snapshot.

Example Workflow for Identifying a Location of a Snapshot Block

Figure 10:
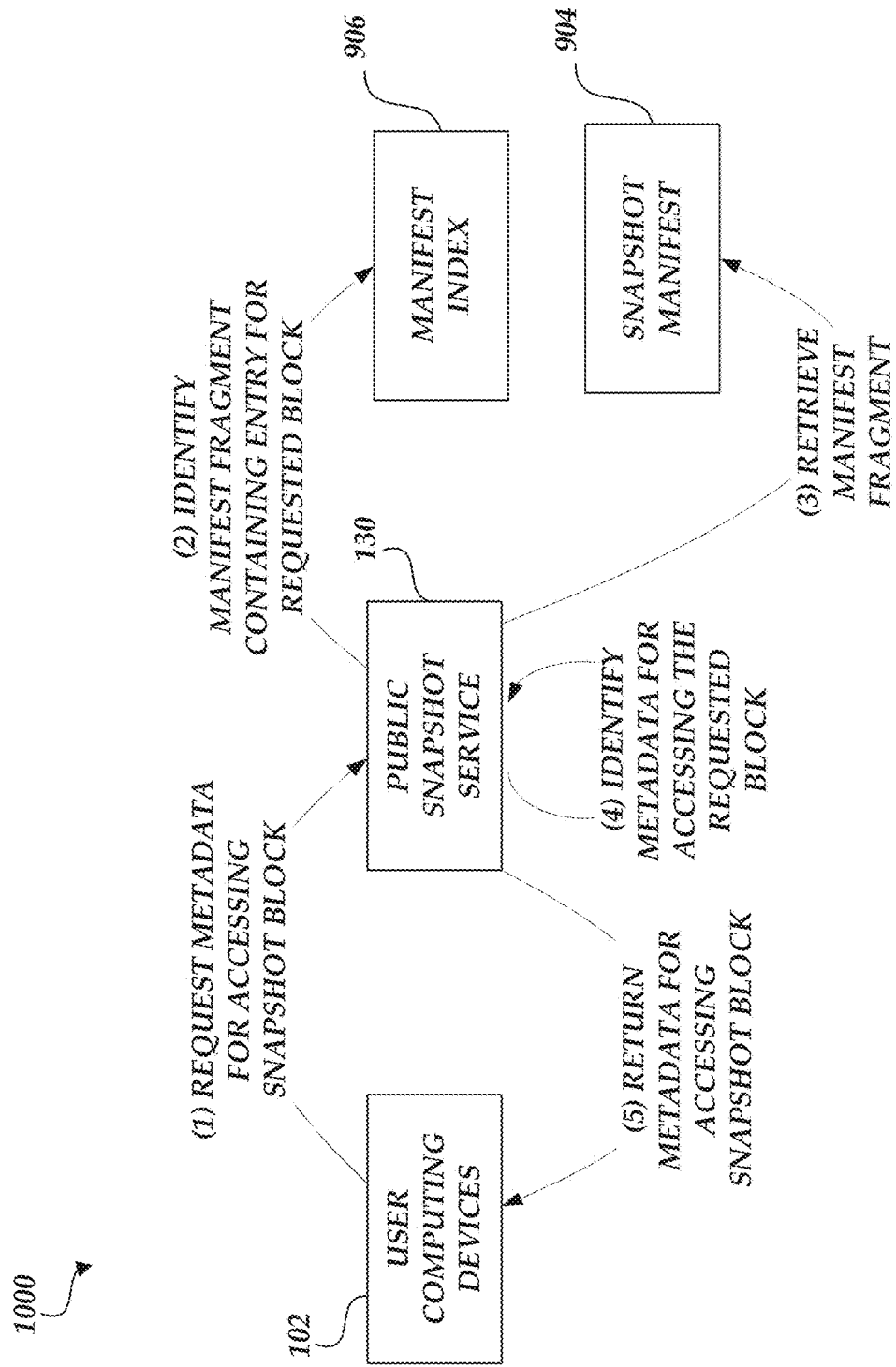
FIG. 10 depicts an example workflow for identifying metadata for accessing a snapshot block within the network environment of FIG. 3 in accordance with aspects of the present disclosure.

FIG. 10 depicts an example workflow 1000 for identifying metadata for accessing data of a block within a snapshot on the network environment of FIG. 3. For example, the metadata for accessing data of the block may be an access token generated based on a location of (i.e. the object corresponding to) a block as stored on the object storage servers 110. Illustratively, the token for each block, independently or in conjunction with other information, such as a block number, may be algorithmically linked to a storage location of the object storing data of the block on the on the object storage servers 110, such that processing of the token and the other information, if any, through the algorithm results in a location of the object on the object storage servers 110 representing data of the block. In one embodiment, the token is opaque to a requesting user computing device 102, such that the device 102 is unable to determine the location of the object.

At step (1), the user computing device 102 requests metadata for accessing the block from the public snapshot service 130. The user computing device 102 can request such metadata for multiple blocks in parallel or in series. For example, the user computing device 102 may request a list of metadata for a specified number of blocks of a snapshot, beginning from a given block number (e.g., list the next 100 blocks recorded within the snapshot starting at block 1). The identification request may be a part of snapshot operations such as reading a snapshot or modifying a snapshot. At step (2), the public snapshot service 130 identifies, using the manifest index 906, the manifest fragment containing the entry for the requested block. The public snapshot service 130 may implement process 1200 to identify the offset N (e.g., by line within the manifest) associated with the manifest fragment containing the entry for the requested block. The manifest index 906 may be stored in an object storage server 110. In such examples, the manifest index 906 can be retrieved from the object storage server 110 and cached locally on the computing system of a public snapshot service 130.

At step (3), the public snapshot service 130 retrieves the identified manifest fragment. In one embodiment, the manifest 904 is stored as a single file, from which the manifest fragment can be individually retrieved. The snapshot service 130 can retrieve M entries from the manifest fragment starting from the manifest line indicated in the manifest index entry for the fragment. If the fragment is the last fragment of the manifest 904 and has less than M entries, the entries comprise the entries from the manifest line indicated in the manifest index entry to the last entry of the manifest 904. In the case the manifest index indicates a logical fragment number N, the snapshot service 130 can retrieve the entries in position ((N−1)×M+1) to position (N)×M of the snapshot manifest 904 wherein N is the logical fragment number identified in step (2). If the fragment is the last fragment of the manifest 904 and has less than M entries, the entries comprise the entries in position ((N−1)×M+1) to the last entry of the manifest 904. In another embodiment, the manifest 904 is stored as a series of files (e.g., manifest-1, manifest-2, etc.) and thus the service 130 can directly retrieve the file corresponding to the manifest fragment. After retrieving the identified manifest fragment, the public snapshot service 130 may verify that the retrieved manifest fragment is valid by comparing a checksum value of the retrieved manifest fragment (e.g., generated by passing the manifest fragment through a checksum calculation, such as an MD5 algorithm) with the checksum value indicated in the manifest index 906.

At step (4), the public snapshot service 130 identifies metadata for accessing of the requested block from the manifest fragment. Specifically, at step (4), the public snapshot service 130 can search the retrieved manifest fragment for the entry corresponding to the requested block and accordingly identify the object storing data of the block as indicated in the manifest entry. The snapshot service 130 may identify other metadata stored in the snapshot manifest 904, such as prefix metadata, the address within the logical path containing the block, filepath data, checksum of the object data, sub-block or block metadata for blocks within the object, object metadata, or the like. At step (5), the public snapshot service 130 returns the metadata for accessing. For example, the metadata can be an object or address for the object storing data of the requested block, or an access token generated by the public snapshot and corresponding to the storage location of the requested block. In a situation where an entry for the block is not identified in step (4), the public snapshot service 130 may return a null or error message. A null message may indicate that the requested block of the block storage device volume has not been backed up by a snapshot (e.g., because it was not written to). In a situation where the request at step (1) was for an enumeration of multiple blocks, the public snapshot service 130 may return an enumerated list containing metadata for accessing the specified number of snapshot blocks. For example, the service 130 may identify a first entry within the retrieved manifest fragment, as well as any additional entries up to the specified number of total entries, and return metadata for each block within those total entries. In some cases, the specified number of blocks may exceed the fragment size M, and as such, the service 130 may at (3) read entries within the manifest outside of the initially retrieved fragments.

Example Routine for Creating Manifest Index

Figure 11:
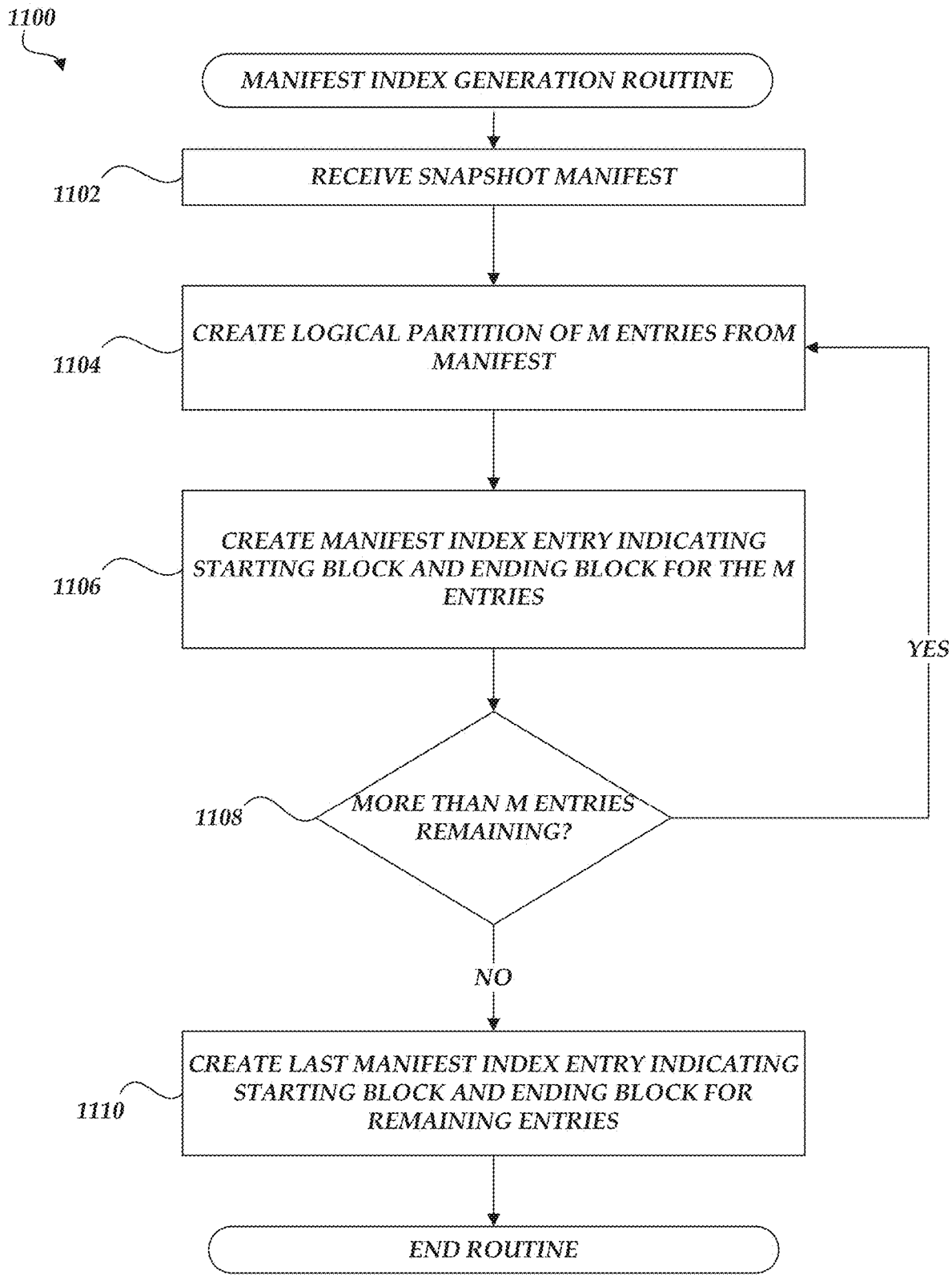
FIG. 11 is a flowchart of an example process for generating a manifest index in accordance with aspects of the present disclosure.

FIG. 11 is a flowchart of an example routine 1100 for generating a manifest index. The routine 1100 may be carried out, for example, by the public snapshot service 130 or one or more other components of the elastic computing system 120 described herein. For convenience, the steps of routine 1100 are described as being performed by a public snapshot server. For example, such a public snapshot server may include one or more hardware computing devices and non-transitory physical computer storage storing instructions that, when executed by the one or more hardware computing devices, cause the one or more hardware computing devices to perform the steps of the routine 1100. Routine 1100 may be initiated by the finalization of a snapshot of a volume (e.g., subsequent to blocks of the volume being written into the snapshot). Additionally or alternatively, routine 1100 may be initiated by a request to create a manifest index.

At block 1102, the public snapshot service 130 receives a snapshot manifest 906, which may be created by the service 130 during finalization of the snapshot. The snapshot manifest 906 may be received from an object storage server 110. If routine 1100 is carried out before the manifest is stored into the object storage server 110, the snapshot manifest may be received from local cache.

At block 1104, the public snapshot service 130 creates a logical partition or a fragment for M entries from the manifest, M being the manifest fragment size. At block 1106, the public snapshot service 130 creates a manifest index entry indicating, the position of the fragment within the manifest (e.g. the line number of an entry of the manifest in which the fragment starts), and the starting and ending block for the entries within the manifest fragment. The public snapshot service 130 may further indicate in the manifest index entry a checksum value associated with the manifest fragment (e.g., generated by passing the entries for the fragment through a checksum calculation).

At decision block 1108, the public snapshot service 130 determines whether there are more than M entries remaining in the manifest that have not been partitioned and entered into the manifest index. If there are more than M entries remaining, the routine returns to block 1104 to partition the next fragment of M entries. If there are less than or equal to M entries remaining, the routine proceeds to block 1110. At block 1110, the public snapshot service 130 creates the last manifest index entry indicating the position of the fragment within the manifest and the starting and ending blocks for the entries within the fragment. The last manifest fragment may have less than M entries. After block 1110, the routine 1100 ends. The public snapshot service 130 may store the created manifest index in the object storage service 110 or local cache. In one embodiment, the public snapshot service 130 stores the created manifest index by separate fragments.

Example Routine for Identifying an Object Using Manifest Index

Figure 12:
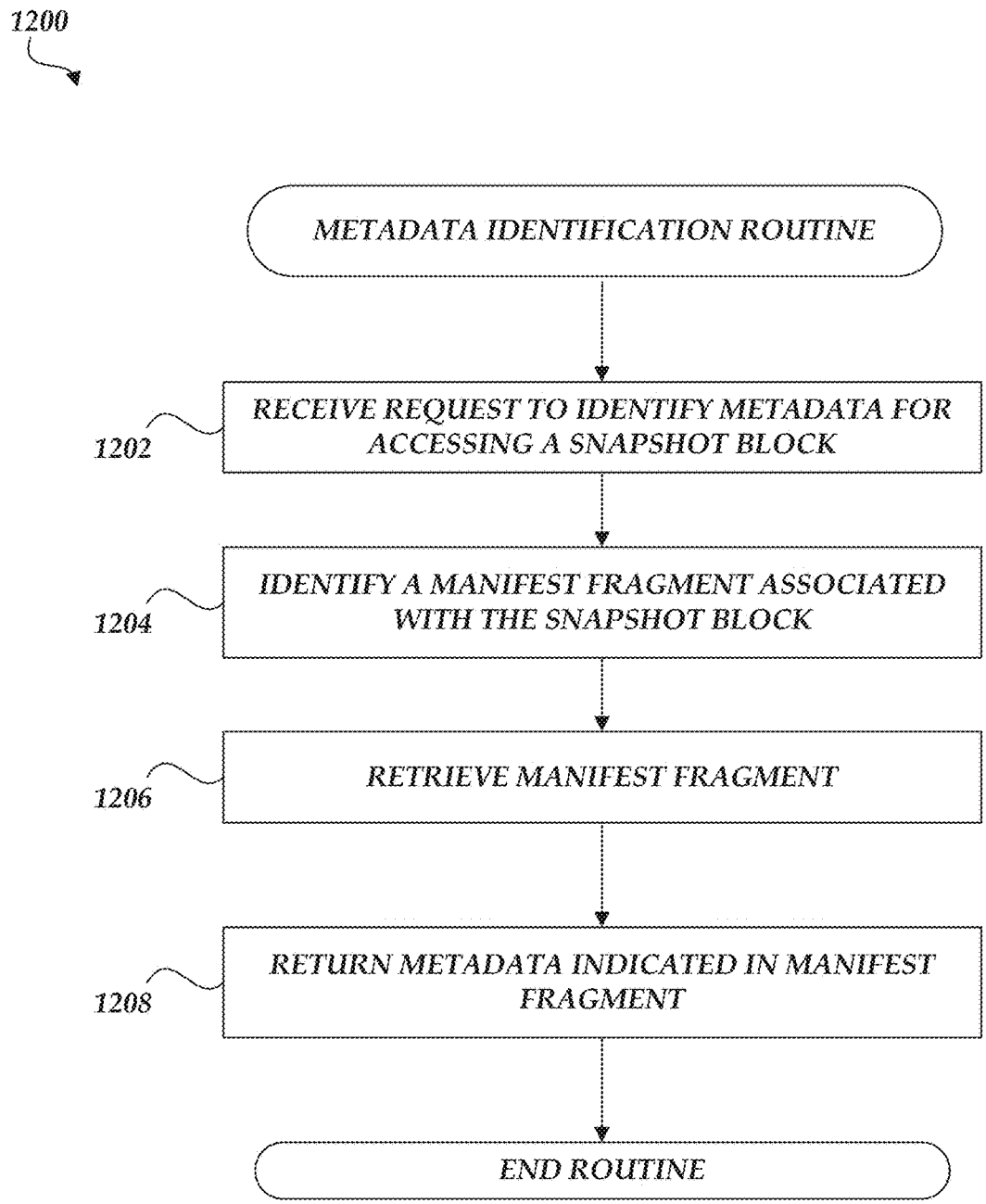
FIG. 12 is a flowchart of an example process for identifying metadata for accessing a snapshot block in accordance with aspects of the present disclosure.

FIG. 12 is a flowchart of an example routine 1200 for identifying the metadata for accessing a snapshot block. For example, the metadata may be the storage location an object storing data corresponding to a block of a volume reflected in a snapshot or an access token corresponding to on a location of (i.e. the object corresponding to) a block within a snapshot. The request may be for metadata for accessing multiple blocks. For example, the request may indicate a list of a specified number of blocks of a snapshot from a given block number. The routine 1200 may be carried out, for example, by the public snapshot service 130 or one or more other components of the elastic computing system 120 described herein. For convenience, the steps of routine 1200 are described as being performed by a public snapshot server. For example, such a public snapshot server may include one or more hardware computing devices and non-transitory physical computer storage storing instructions that, when executed by the one or more hardware computing devices, cause the one or more hardware computing devices to perform the steps of the routine 1200.

At block 1202, the public snapshot service 130 receives a request to identify metadata for accessing a block of a volume reflected in a snapshot. The request may be received from a user computing device 102.

At block 1204, the public snapshot service 130 identifies the manifest fragment that may contain the entry for the requested block from the manifest index. The public snapshot service 130 can identify which fragment may contain the requested block by comparing the block index of the requested block with the starting and ending block indices of each fragment as enumerated in the manifest index. The public snapshot can identify an entry of the manifest index whose range includes the requested block, and thus identify the fragment associated with the block. In another example, the public snapshot service 130 can identify which fragment may contain the requested block by comparing the block index of the requested block with the starting block indices of each fragment as enumerated in the manifest index. For example, the public snapshot service 130 may determine the manifest fragment that precedes the first manifest fragment with a starting block index greater than the requested block index. With respect to the manifest index 906 depicted in FIG. 9, the public snapshot service 130 may be requested to identify the storage location, or the object storing the data, of Block 9. The public snapshot service 130 can determine from the manifest index 906 that manifest fragment N=2 may contain the entry for Block 9 because the first manifest fragment with the starting block index that is greater than Block 9 is N=3 where the starting block of the fragment is Block 11.

At block 1206, the public snapshot service 130 retrieves the identified manifest fragment. The public snapshot service 130 may retrieve the identified manifest fragment from object storage servers 110. In one embodiment, the manifest 904 is stored as a single file. The snapshot service 130 can retrieve M entries from the manifest fragment starting from the manifest line indicated in the manifest index entry for the fragment. If the fragment is the last fragment of the manifest 904 and has less than M entries, the entries comprise the entries from the manifest line indicated in the manifest index entry to the last entry of the manifest 904. In the case the manifest index indicates an offset N, the snapshot service 130 can retrieve the entries in position ((N−1)×M+1) to position N×M of the snapshot manifest wherein N is logical fragment number identified at block 1204 and M is the fragment size. If the fragment is the last fragment of the manifest and has less than M entries, the entries comprise the entries in position ((N−1)×M+1) to the last entry of the manifest. In another embodiment, the manifest 904 is stored as a series of files (e.g., manifest-1, manifest-2, etc.) and thus the service 130 can directly retrieve the file corresponding to the manifest fragment. After retrieving the identified manifest fragment, the public snapshot service 130 may verify that the retrieved manifest fragment is valid by comparing the checksum value of the retrieved manifest fragment (e.g., generated by passing the manifest fragment through a checksum calculation, such as an MD5 algorithm) with the checksum value indicated in the manifest index.

At block 1208 the public snapshot service 130 can determine whether the retrieved fragment contains an entry for the requested block. In one embodiment where an object stores data of one block of the block storage device volume, for example, the public snapshot service 130 may conduct a search through the entries of the manifest fragment for the requested block index. In another embodiment, an object may store data of more than one block, and accordingly the snapshot manifest may indicate that a range of blocks are stored on an object. In such embodiment, the public snapshot service 130 may conduct a search to identify the object including the requested block, based on ranges indicated within the manifest. In instances where a request specifies multiple blocks, the service may identify entries within the manifest for each such block. For example, where the request is a "list" operation requesting metadata of a given number of blocks beginning with a specific block number, the service may identify a number of entries of the manifest fragment of specified size, beginning from the entry corresponding to the specified block number. In the case of the specified size exceeding the number of entries within the manifest fragment, the service may obtain subsequent fragments and continue to read such entries.

In addition, at block 1208, the public snapshot service 130 returns the metadata for accessing the requested block, which may be read from entry for the block identified in the manifest fragment. For example, the metadata may be the storage location an object storing data corresponding to a block of a volume reflected in a snapshot or an access token corresponding to a location of (i.e. the object corresponding to) a block within a snapshot. The public snapshot service 130 may return additional information indicated in the manifest entry, for example, prefix metadata, the address within the logical path containing the block, filepath data, checksum of the object data, sub-block or block metadata for blocks within the object, other object metadata, or the like. If the public snapshot 130 determines that the retrieved fragment does not contain an entry for the requested block, the public snapshot 130 can return a null indication or message. The null indication or message may indicate that the requested block was not backed up and stored as part of a snapshot. The error indication or message may indicate that the manifest index or the manifest is corrupted. If an entry for the requested block is not found in the fragment in an embodiment where the request is for metadata enumerated for multiple blocks starting at the requested block, the public snapshot 130 may begin enumerating the metadata from the next sequential block (i.e. the block with the lowest block index that is higher than the requested block) that has an entry in the manifest. For example, where a "list" operation request is submitted for the first 100 blocks beginning with block 5 (i.e. a list for 100 blocks identified sequentially from block 5) and block 5 is not stored within the snapshot, the operation may result in returning of metadata for the first 100 entries in the manifest corresponding to a block index higher than 5. Furthermore, in an embodiment where the request is for metadata enumerated for multiple blocks starting at the requested block, the public snapshot 130 may determine that additional manifest fragments are to be retrieved in order to generate a list of the specified size.

Example Volume and Sub-Block Level Snapshots

Figure 13:
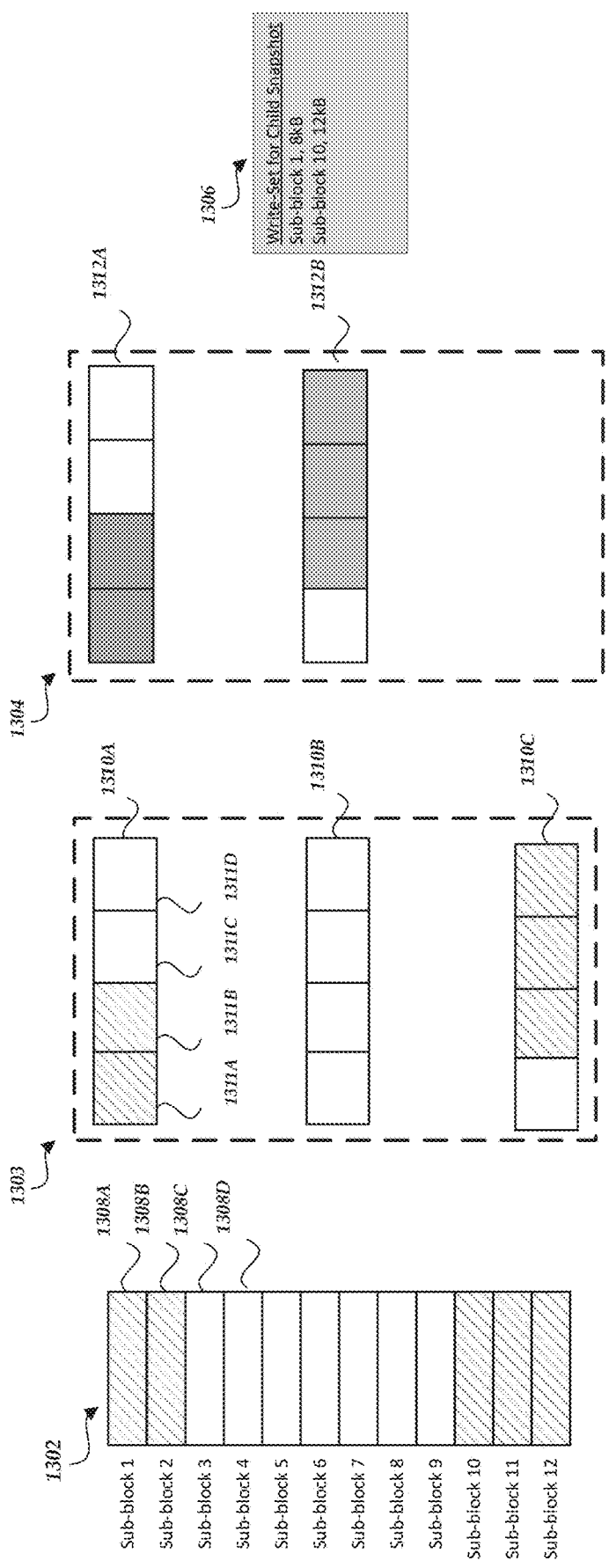
FIG. 13 depicts an example volume and snapshots of the volume in accordance with aspects of the present disclosure.

FIG. 13 depicts an example volume and snapshots of the volume in accordance with aspects of the present disclosure. It should be understood that these depictions of the volume, snapshots, and write-set are only one example implementing one or more aspects of the present disclosure. While the volume 1302 is depicted to be comprised of 12 operating-system level blocks or snapshot sub-blocks, a person skilled in the art would understand that the snapshot can have more or less than 12 snapshot sub-blocks. Furthermore, though each block 1310A of parent snapshot 1303 and each block 1312A of the child snapshot 1304 are logically partitioned into four partitions, or sub-blocks, a person skilled in the art would understand that the snapshot block can be partitioned into more or less than four partitions. Indeed, in accordance with aspects of the present disclosure, modifications to sub-blocks may be made at any desired granularity (e.g., at the level of individual bytes). Similarly, though FIG. 13 depicts the entries of the write-set 1306 as comma separated values or expressions, a person of the ordinary skill in the arts would understand that the entries can be implemented in other ways such as the entries represented in binary, the entries as entries of a database structure, key-value data, look-up table, and the like.

FIG. 13 depicts a volume 1302 of a block storage device that is the basis for the parent snapshot 1303 and child snapshot 1304. As depicted in FIG. 13, the volume 1302 comprises operating-system-level blocks (e.g., logical groupings of data organized by an operating system of a user computing device 102), which are generally referred to herein as "sub-blocks," as further detailed below. As an example, each operating-system-level block of the block storage volume can be 4 kB and represent the unit of data at which an operating system writes to the block storage device. In the course of its operation, a user computing device 102 may modify the volume 1302. In FIG. 13, operating-system-level blocks such as 1308A and 1308B that have been modified since the last back-up (i.e. since the parent snapshot 1303 was created) are striped. Operating-system-level blocks that were not modified such as 1308C and 1308D are not striped.

Generally described, a snapshot can be a point-in-time representation of a block storage volume 1302, wherein the snapshot is stored on the one or more object storage servers as a set of objects. Parent snapshot 1303 comprises 3 snapshot blocks 1310A, 1310B, 1310C and each block is shown as logically partitioned into sub-blocks (though this partitioning may not actually be apparent within the data representing the snapshot block). For example, parent snapshot block 1301A is shown as partitioned into snapshot blocks 1311A-D. As depicted in FIG. 13, an operating-system-level blocks 1308A-D of a volume 1302 can be represented in the parent snapshot 1303 as sub-blocks of a snapshot block, such as sub-blocks 1311A-D. In other words, data stored in operating-system-level blocks 1-4 of the volume 1302 are stored in the object servers as a single snapshot block 1310A. Likewise, data stored in operating-system-level blocks 5-8 of the volume 1302 are stored in the object servers as a single snapshot block 1310B, and data stored in operating-system-level blocks 9-12 of the volume 1302 are stored in the object servers as a single snapshot block 1310C. As depicted in FIG. 13, sub-blocks that have been modified since the parent snapshot 1303 was created are striped. The modified sub-blocks such as 1311A, 1311B correspond to the modified operating-system-level blocks such as 1308A, 1308B. The modified sub-blocks in snapshot block 1310C correspond to the modified operating-system-level blocks 10-12 of the volume 1302.

Child snapshot 1304 can comprise snapshot blocks 1312A, 1312B that represent writes to the parent snapshot 1303 at the level of sub-blocks (e.g., OS-level blocks), which may for example represent modifications made to the volume 1302 since creation of the parent snapshot. Like the parent snapshot blocks 1310A-C, child snapshot blocks 1312A, 1312B can be stored as objects on object storage servers. In FIG. 13, the shaded sub-blocks of child snapshot blocks 1312A, 1312B corresponds to the sub-block modifications written to the child snapshot blocks 1312A, 1312B. As depicted in FIG. 13, parent snapshot blocks with no sub-block level changes, such as parent snapshot block 1310B may not be represented in the child snapshot 1304. When a child snapshot 1304 is created, for example by process 1500, a corresponding write-set is also created. As depicted in FIG. 13, the write-set contains entries for each child snapshot block 1312A, 1312B; each write-set entry can indicate a sub-block offset and length of data written to the modified snapshot block. The sub-block offset can indicate the offset or position of data written to the modified block. In one embodiment, the offset is relative to the beginning of the snapshot block (e.g., indicating that writes occurred at a first sub-block within the block, 4 kB into the snapshot block, etc.). In another embodiment, the offset is relative to logical block addresses used by an operating system controlling the underlying volume 1302. For example, in FIG. 13, the child snapshot block 1312A corresponds to sub-blocks 1-4 and represents changes to sub-blocks 1-2. The block offset of snapshot block 1312A may, for example, be a value of 1, as the data of the child block 1312A begins at the first sub-block of the volume 1302. The child snapshot block 1312B corresponds to sub-blocks 9-12 and represents changes to sub-blocks 10-12. The block offset of snapshot block 1312B may therefore be a value of 10, as snapshot block 1312B corresponds to data written to sub-block 10-12. As depicted in FIG. 13, the logical positions of the sub-block modifications represented in child snapshot block 1312A, 1312B correspond to the logical positions of the modified OS-level blocks within the volume 1302. Offsets may be indicated in terms of sub-block identifiers (e.g., corresponding to OS-level blocks) and/or byte values (e.g., a number of kilobytes), as these values may be mathematically interchangeable given knowledge of a block size used by an operating system maintaining the volume 1302.

Example Workflow for Creating Sub-Block Level Snapshots

Figure 14:
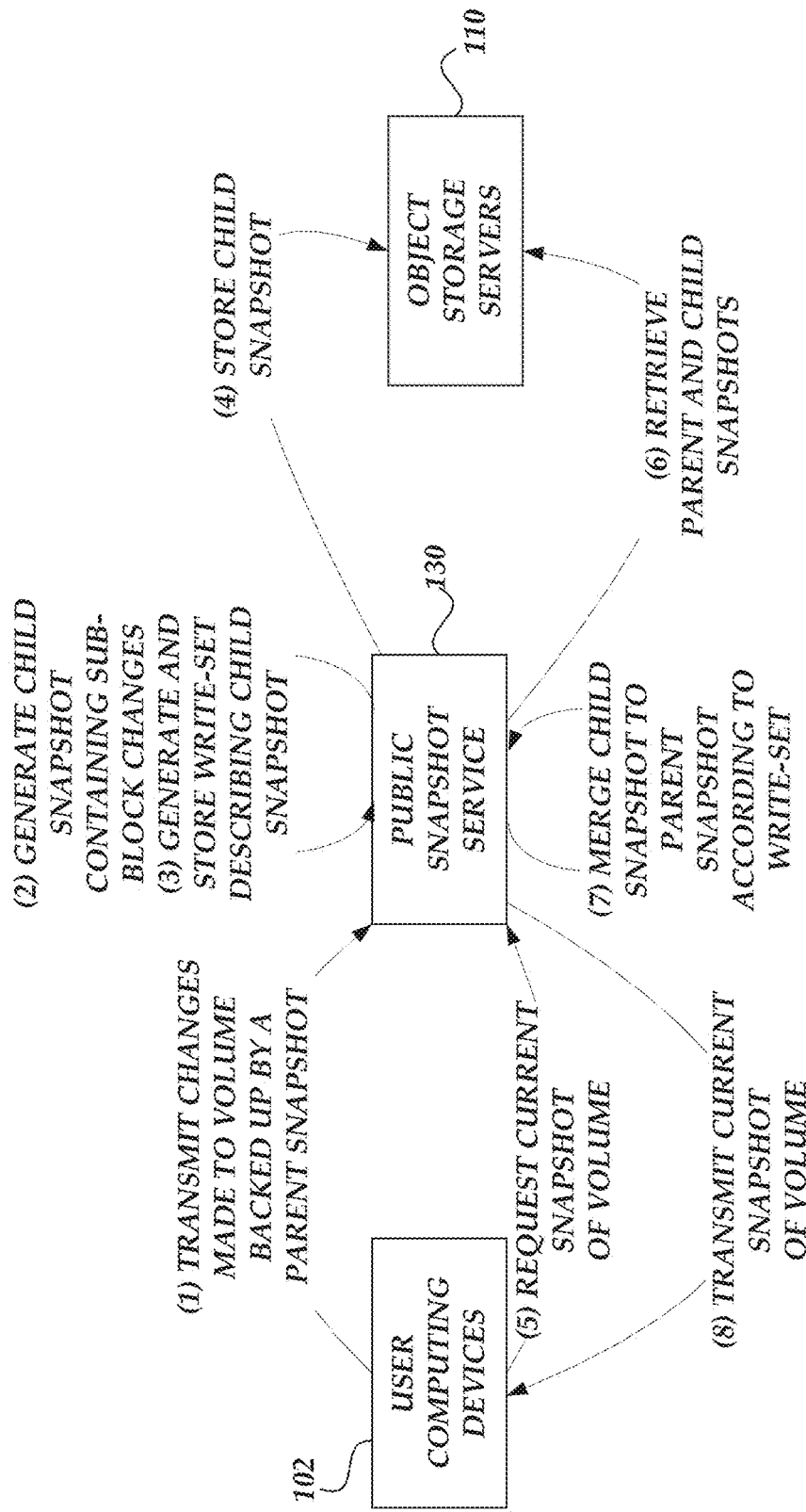
FIG. 14 depicts an example workflow for creating a child snapshot from sub-block level modifications and merging parent and child snapshots in accordance with aspects of the present disclosure.

FIG. 14 depicts an example workflow for creating a child snapshot from sub-block level modifications and merging parent and child snapshots. At step (1), a user computing device 102 transmits to the public snapshot service 130 a write to a sub-block of a snapshot, which write may reflect changes made to a block storage volume such as on an on-premise storage device backed up by a parent snapshot. In other embodiments, the public snapshot service 130 may receive writes reflecting changes made to a volume hosted on a block storage service.

At step (2), the public snapshot service can generate a child snapshot block containing the sub-block level changes. The public snapshot service can generate a buffer object containing a defined bit pattern (e.g., all zeros to result in a "zero buffer"), to which to apply the written information received at step (1) as sub-block changes, such that the buffer contains a record of the sub-block changes to the parent snapshot block. In embodiments where snapshots are stored at the public snapshot service 130 in encrypted form, the public snapshot service can encrypt the contents of the buffer to result in the creation of the child block. At step (3), the public snapshot service 130 generates and stores a write-set for the child snapshot block. The public snapshot service 130 can generate entries of the write-set for each child snapshot block, indicating a sub-block offset (e.g., a position within the child block at which data is written) and length of the data written to the child blocks. The public snapshot service 130 can calculate a checksum for each entry of the write-set. For example, the public snapshot service 130 can compute the checksum (e.g. Base64 encoded SHA256 checksum) by concatenating the checksums of all sub-blocks belonging to the child snapshot block in the increasing order by their logical positions and then computing checksum of the concatenated checksums. In some embodiments, the write set further includes a logical position of the child block relative to other blocks of the snapshot (e.g., as block 1, 2, 3, etc.). In other embodiments, the logical position of the child block may be stored outside the write set (e.g., within path information for the child block, as discussed above). The public snapshot service 130 can store the write-set in a metadata data store or in an object storage server. A person skilled in the arts will understand that step (2) and (3) can occur sequentially or at least partly concurrently. At step (4), the public snapshot service stores one or more blocks of the child snapshot as one or more objects in the object storage servers 110.

At step (5), the user computing device 102 requests a current snapshot of a block storage volume backed up by the public snapshot service 130. At step (6), the public snapshot service 130 retrieves the parent and child snapshots associated with the request. At step (7), the public snapshot service merges the child snapshot blocks with the parent snapshot blocks according to offsets indicated in the write-set. Specifically, the public snapshot service may "overlay" written data within the child snapshot blocks with the data in a corresponding parent snapshot block in order to generate data representing a modified block. The data written within the child snapshot blocks may be identified on the basis of the offset and length, such as by beginning to read from the child snapshot at a position indicated by the offset and for a number of bytes indicated by the length. At step (7), the public snapshot service 130 may execute process 1600 to merge the child and parent snapshots. At step (8), the public snapshot service 130 may transmit the merged snapshot to the user computing device 102. In other embodiments, the public snapshot service 130 may store the merged snapshot as a new snapshot in the object storage servers 110.

While the interactions above generally relate to merging child and parent snapshot blocks in response to a request from a user computing device 102, in other embodiments merging may occur prior to such a request. For example, merging may occur on instruction of a user computing device 102 to "seal" or complete a snapshot. Illustratively, interactions (1)-(3) may occur repeatedly, as the user computing device 102 transmits changes to a volume since a parent snapshot. Thereafter, prior to interaction (4), the public snapshot service 130 may, for each block of the child snapshot containing sub-block changes, merge the block with a corresponding block of the parent snapshot according to the write-set for the block. The child snapshot stored at (4) may then include all blocks modified relative to the parent, either as completely altered blocks or partially altered blocks generated by merging sub-block writes with a parent block according to a corresponding write-set. The child snapshot may further include a manifest of these altered blocks, such that reading the altered blocks stored within the child snapshot together with unaltered blocks of the parent snapshot enables reading of the snapshot. Illustratively, conducting a merging of sub-block modifications to create partially altered blocks prior to storing the child snapshot may speed servicing of requests to read data from the child snapshot.

Figure 15:
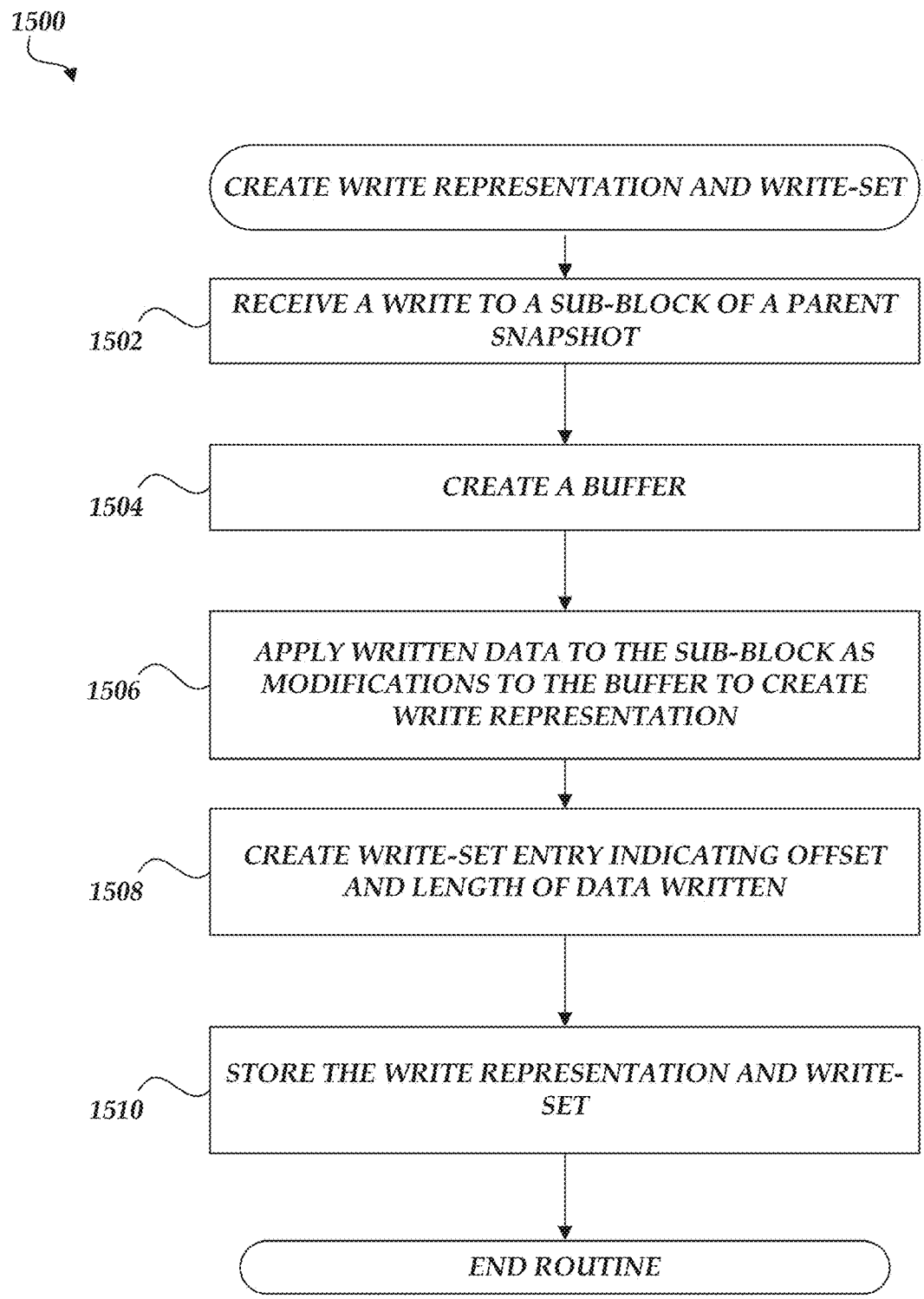
FIG. 15 is a flowchart of an example process for creating a child snapshot and write-set for sub-block modifications made to a snapshot of a volume in accordance with aspects of the present disclosure.

Example Routine for Creating Sub-Block Write Representations and Write-Set for Sub-Blocks FIG. 15 is a flowchart of an example process for creating a write representation and write-set for sub-block modifications made to a snapshot of a volume in accordance with aspects of the present disclosure. The routine 1500 may be carried out, for example, by the public snapshot service 130 or one or more other components of the elastic computing system 120 described herein. For convenience, the blocks of routine 1500 are described as being performed by a public snapshot server. For example, such a public snapshot server may include one or more hardware computing devices and non-transitory physical computer storage storing instructions that, when executed by the one or more hardware computing devices, cause the one or more hardware computing devices to perform the blocks of the routine 1500.

At block 1502, the public snapshot service 130 receives a write to a sub-block of a parent snapshot block. The public snapshot service 130 may receive the write from the user computing devices 102, on-premise storage devices, or other block storage services. Data written to sub-blocks may reflect changes made to the OS-level blocks of a volume. For example, an operating system may perform operations on its storage volumes by 4 kB block units, and a snapshot created from the volume may be configured to store the snapshot as a plurality of partitions, or snapshot blocks, of size 512 kB stored as objects on one or more object storage servers. In such example, each snapshot block can store data corresponding to 128 OS-level blocks. The OS-level blocks and snapshot blocks may be identified with sequential addresses or identifiers, for example, as depicted by the example volume 1302 in FIG. 13. A snapshot of a volume may be sparse, meaning that snapshot blocks may not exist for sub-blocks of the volume that do not contain data. The volume may be modified such that some but not all sub-blocks are modified, as depicted by the example volume 1302 in FIG. 13.

At block 1504, the public snapshot server creates a buffer object for applying the data written to the sub-blocks. The buffer object may be an object comprising zeros that is the size of a snapshot block.

At block 1506, the public snapshot server 130 applies the written data to the sub-blocks as modifications to the buffer, such that the buffer contains contents representing the write to the sub-block (a "write representation"). Applying the written data to the buffer may comprise writing the written data to the positions within the buffer corresponding to the sub-blocks position in the snapshot block, as depicted in the example child snapshot blocks 1312A, 1312B. In some embodiments, the public snapshot service may encrypt the data of the sub-buffer prior to storing the write representation.

At block 1508, the public snapshot server 130 creates a write-set entry for the write representation indicating an offset and length of the data written to as the sub-block write. The offset can indicate the offset or position of the data written within the sub-block write. The offset may be described relative to a beginning of the written-to snapshot block and/or the beginning of the snapshot, in terms of a logical block position (e.g., an OS-level block), a byte position, or similar information. The public snapshot service 130 can calculate a checksum for each entry of the write-set. For example, the public snapshot service 130 can compute the checksum (e.g. Base64 encoded SHA256 checksum) by concatenating the checksums of all sub-blocks in the increasing order by their offsets and then computing checksum of the concatenated checksums.

At block 1510, the public snapshot service 130 stores the write representation and write-set. The write representation can be stored as an object in an object storage server, or held in memory of the snapshot service 130 for merging with a version of the block from a parent snapshot (e.g., during sealing of a child snapshot). The write-set can be stored on a metadata data store in maintained by the public snapshot service 130, in an object storage server, in an external database, or the like.

Example Routine for Merging Child and Parent Snapshots

Figure 16:
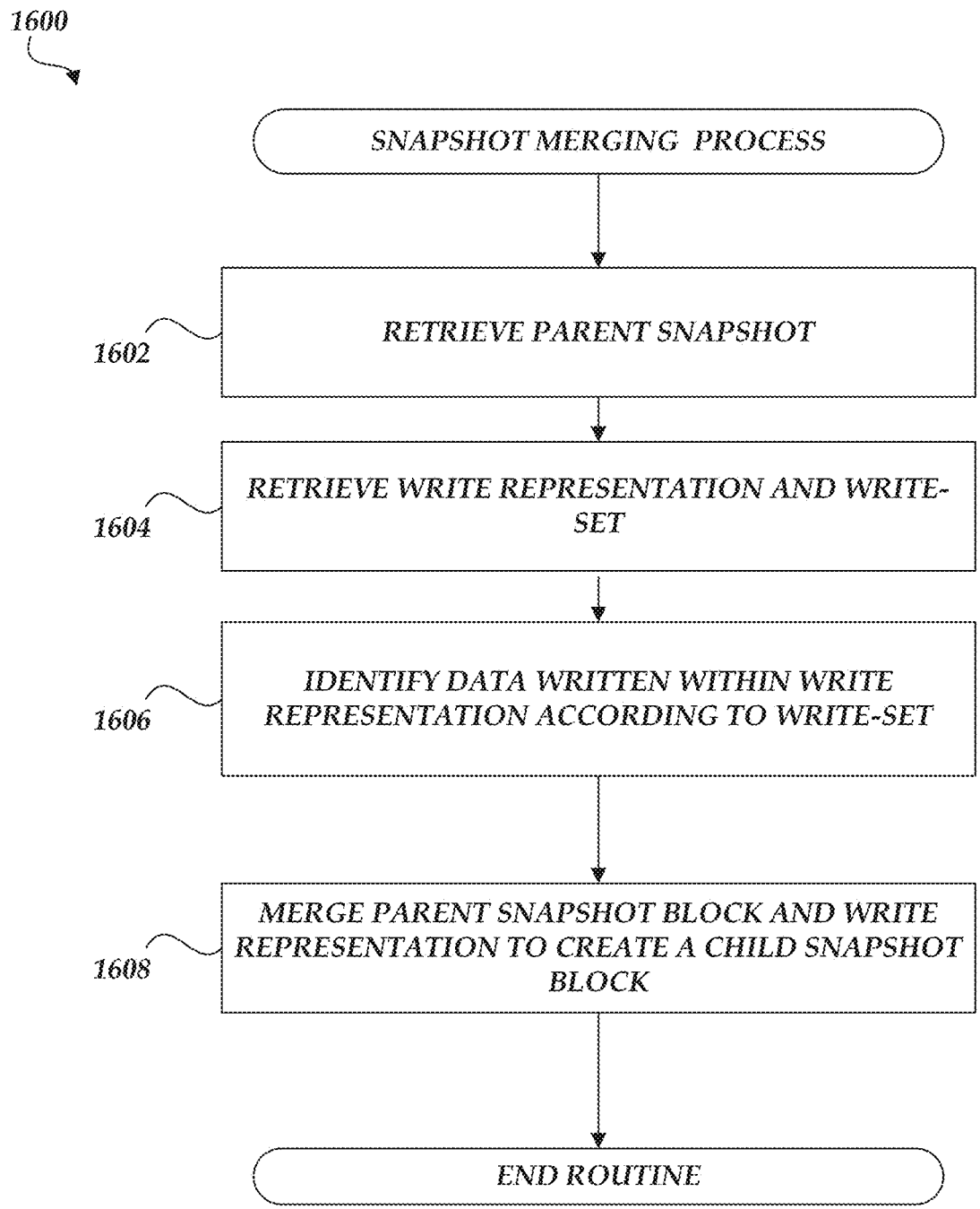
FIG. 16 is a flowchart of an example process for merging a parent and child snapshot in accordance with aspects of the present disclosure.

FIG. 16 is a flowchart of an example process for merging a parent and child snapshot in accordance with aspects of the present disclosure. The routine 1600 may be carried out, for example, by the public snapshot service 130 or one or more other components of the elastic computing system 120 described herein. For convenience, the blocks of routine 1600 are described as being performed by a public snapshot server. For example, such a public snapshot server may include one or more hardware computing devices and non-transitory physical computer storage storing instructions that, when executed by the one or more hardware computing devices, cause the one or more hardware computing devices to perform the blocks of the routine 1600. In one embodiment, routine 1600 is initiated by the public snapshot service 130 in response to receiving a request to "seal" or complete a child snapshot, subsequent to a user computing device 102 writing to one or more blocks of the child snapshot.

At block 1602, the public snapshot service 130 retrieves the parent snapshot corresponding to the requested child snapshot from the object storage servers. Retrieval of the parent snapshot may occur in response to identifying the metadata enabling access to the snapshot using routine 1200. In one embodiment, the public snapshot service 130 may retrieve one or more blocks of the parent snapshot as specified by a request to generate a child snapshot.

At block 1604, the public snapshot service 130 retrieves the write representations for writes made to the child snapshot. The public snapshot service 130 further retrieves the write-sets corresponding to the write representations from a metadata data store or an object storage server. The public snapshot service 130 can perform a checksum on the retrieved sub-block write representations to verify that the checksum is as indicated in the write-set entry corresponding to the sub-blocks.

At block 1606, the public snapshot service 130 identifies data written within each write representation according to the write-set. For example, the public snapshot service 130 may, for each write representation, obtain the write-set corresponding to the write representation, and identify data to be written to the child snapshot block according to the offset and length information within the write-set. The public snapshot service 130 may further identify the parent snapshot block corresponding to child snapshot block.

At block 1608, the public snapshot service 130 merges the identified parent snapshot block and write representation to generate a child snapshot block. Merging the parent snapshot block and the write representation may comprise, for each write representation, replacing data within the corresponding parent snapshot block with the corresponding data written to the write representation (e.g., as identified according to the offset and length in the write set). When the parent snapshot block and write representation are merged, the resulting child snapshot block may be transmitted to the requesting user, or stored as part of the child snapshot in the object servers. Routine 1600 can be repeated or be performed in at least partly concurrently to create multiple child snapshot blocks according to the write-set.

While the interactions above generally relate to merging a write representation to a parent snapshot block to generate child snapshot block, in other embodiments, the public snapshot service 130 may merge multiple write representations to create a child snapshot block. For example, before a child snapshot is sealed, the public snapshot service 130 may receive multiple sub-block level modifications that are represented as multiple write representations. Accordingly, blocks 1604-1608 may be repeated to merge the multiple sub-block level modifications to the parent snapshot block to generate a child snapshot. Moreover, in some embodiments, the public snapshot service 130 may merge one or more write representations with a prior version of a block for a given snapshot to create a final version of that block. Illustratively, a user may initially write data to an entire block of a snapshot, and subsequently (e.g., prior to sealing of that snapshot) conduct a write against a sub-block of that block. The public snapshot service 130, via the interactions described above, may thus during sealing of the snapshot merge a write representation of that sub-block write with the previously-written data (representing a prior version of the block) to result in a final version of the block. Thus, merging may occur both on the basis of a block of a parent snapshot or on the basis of a prior version of block data for a current snapshot (whether that snapshot is a standalone snapshot, a child snapshot, etc.).

Example Architecture of Public Snapshot Service

Figure 17:
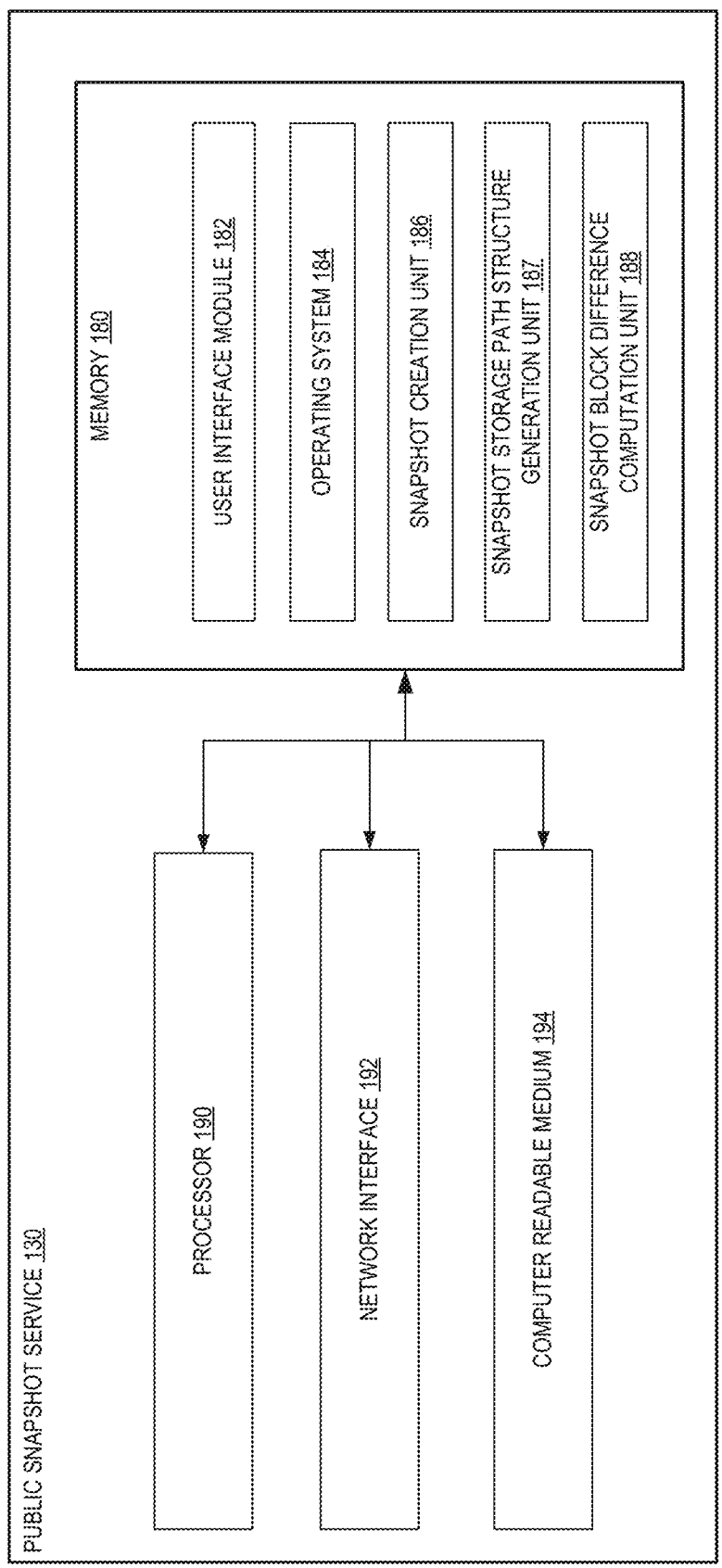
FIG. 17 depicts a general architecture of a computing device or system providing a public snapshot service in accordance with aspects of the present disclosure.

FIG. 17 depicts an example architecture of a computing system (referred to as the public snapshot service 130) that can be used to perform one or more of the techniques described herein or illustrated in FIGS. 1-16. The general architecture of the public snapshot service 130 depicted in FIG. 17 includes an arrangement of computer hardware and software modules that may be used to implement one or more aspects of the present disclosure. The public snapshot service 130 may include many more (or fewer) elements than those shown in FIG. 17. It is not necessary, however, that all of these elements be shown in order to provide an enabling disclosure. As illustrated, the public snapshot service 130 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the network 104 illustrated in FIGS. 1 and 3.

The processor 190 may also communicate with memory 180. The memory 180 may contain computer program instructions (grouped as modules in some embodiments) that the processor 190 executes in order to implement one or more aspects of the present disclosure. The memory 180 may include RAM, ROM, and/or other persistent, auxiliary, or non-transitory computer-readable media. The memory 180 may store an operating system 184 that provides computer program instructions for use by the processor 190 in the general administration and operation of the public snapshot service 130. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device (e.g., user computing device 102 of FIG. 1), e.g., via a navigation and/or browsing interface such as a browser or application installed on the user computing device. In addition, the memory 180 may include or communicate with one or more data stores.

In addition to and/or in combination with the user interface module 182, the memory 180 may include the snapshot creation unit 186, the snapshot storage path structure generation unit 187, and the snapshot block difference computation unit 188 that may be executed by the processor 190. In one embodiment, the snapshot creation unit 186, the snapshot storage path structure generation unit 187, and the snapshot block difference computation unit 188 individually or collectively implement various aspects of the present disclosure, e.g., creating a snapshot, generating a snapshot storage path structure for storing the data blocks in the snapshot, restoring the snapshot onto a destination volume, computing a snapshot block difference between the snapshot and another snapshot (e.g., a parent snapshot), creating manifest indices, creating sub-block level snapshots, and/or other aspects discussed herein or illustrated in FIGS. 1-16.

While the snapshot creation unit 186, the snapshot storage path structure generation unit 187, and the snapshot block difference computation unit 188 are shown in FIG. 17 as part of the public snapshot service 130, in other embodiments, all or a portion of the snapshot creation unit 186, the snapshot storage path structure generation unit 187, and the snapshot block difference computation unit 188 may be implemented by other components of the elastic computing system 120 and/or another computing device. For example, in certain embodiments of the present disclosure, another computing device in communication with the elastic computing system 120 may include several modules or components that operate similarly to the modules and components illustrated as part of the public snapshot service 130. It will also be appreciated that, in some embodiments, a user computing device (e.g., the user computing device 102 of FIG. 1) may implement functionality that is otherwise described herein as being implemented by the elements and/or modules of the public snapshot service 130. For example, the user computing device 102 may receive code modules or other instructions from the public snapshot service 130 and/or other components of the elastic computing system 120 via the network 104 that are executed by the user computing device 102 to implement various aspects of the present disclosure.

TERMINOLOGY

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system, comprising:
  a cloud provider system comprising:
    a snapshot repository for storing block-level snapshots, wherein the block-level snapshots are each associated with specific storage path structure data;
    and a snapshot lineage database for storing snapshot lineage data indicating one or more lineages of the block-level snapshots stored in the snapshot repository;
    and a public snapshot server in networked communication with the snapshot repository and the snapshot lineage database;
  and a block storage volume implemented on a client data storage server that is external to the cloud provider system, wherein the block storage volume stores a plurality of data blocks;
  wherein the public snapshot server is configured to:
    receive a snapshot creation request to create an incremental snapshot of the block storage volume, wherein the block storage volume is associated with a parent snapshot stored in the snapshot repository, wherein the parent snapshot represents a prior state of the block storage volume preceding and different from a current state of the block storage volume;
    determine that a subset of data blocks of the plurality of data blocks stored in the block storage volume are identical to a corresponding set of data blocks associated with the parent snapshot, based on an identification of the subset of data blocks provided by a user of the public snapshot server, without performing a block-by-block data comparison between the parent snapshot and the incremental snapshot;
    generate first storage path structure data associated with the incremental snapshot, wherein the first storage path structure data includes (i) first path information associated with the subset of data blocks and (ii) second path information associated with one or more additional data blocks of the plurality of data blocks, wherein the first path information is identical to parent path information associated with the corresponding set of data blocks associated with the parent snapshot, and the second path information is not identical to any path information associated with the parent snapshot; and
    cause the incremental snapshot to be stored in the snapshot repository along with the first storage path structure data.

2. The system of claim 1, wherein the public snapshot server is further configured to:
  receive, from a user computing device, a request to compute a snapshot block difference between the parent snapshot and the incremental snapshot;
  generate a list of data blocks that are each associated with path information not included in the parent path information associated with the parent snapshot; and
  output the list of data blocks for presentation on the user computing device.

3. The system of claim 2, wherein generating the list of data blocks comprises determining, for each respective data block associated with the incremental snapshot, whether path information associated with the respective data block is included in the parent path information associated with the parent snapshot, without comparing block data within the respective data block to block data within a corresponding data block associated with the parent snapshot.

4. The system of claim 2, wherein the public snapshot server is further configured to:
  receive, from the user computing device, a request to retrieve block data associated with the list of data blocks outputted to the user computing device; and
  output the block data associated with the list of data blocks.

5. A computer-implemented method, comprising:
  receiving a request to create an incremental snapshot of a storage volume storing a plurality of data blocks, wherein the storage volume is associated with a parent snapshot stored in a data repository;
  determining that a subset of data blocks of the plurality of data blocks stored in the storage volume are identical to a corresponding set of data blocks associated with the parent snapshot, wherein determining that the subset of data blocks are identical comprises identifying the subset of data blocks provided by a user, without performing a block-by-block data comparison between the parent snapshot and the incremental snapshot;
  generating storage path structure data associated with the incremental snapshot, wherein the storage path structure data includes (i) first path information associated with the subset of data blocks and (ii) second path information associated with one or more additional data blocks of the plurality of data blocks, wherein the first path information is included in parent storage path structure data associated with the parent snapshot, and the second path information is not included in parent storage path structure data associated with the parent snapshot; and
  storing the incremental snapshot in the data repository along with the storage path structure data.

6. The computer-implemented method of claim 5, further comprising:
  receiving, from a user computing device, a request to compute a snapshot block difference between the parent snapshot and the incremental snapshot;
  generating a list of data blocks that are each associated with path information not included in the parent path information associated with the parent snapshot; and
  outputting the list of data blocks for presentation on the user computing device.

7. The computer-implemented method of claim 6, wherein generating the list of data blocks comprises determining, for each respective data block associated with the incremental snapshot, whether path information associated with the respective data block is included in the parent path information associated with the parent snapshot.

8. The computer-implemented method of claim 5, wherein the storage volume is implemented by a private data storage server of the user, wherein the storage volume is not accessible by a public snapshot server that is in networked communication with the data repository.

9. The computer-implemented method of claim 5, wherein the storage volume is implemented by a block store server on behalf of the user, wherein the storage volume is accessible by a public snapshot server that is in networked communication with the data repository.

10. A non-transitory computer-readable medium storing instructions that, when executed by a computing system, cause the computing system to perform operations comprising:

receiving a request to create an incremental snapshot of a storage volume storing a plurality of data blocks, wherein the storage volume is associated with a parent snapshot stored in a data repository;

determining that a subset of data blocks of the plurality of data blocks stored in the storage volume are identical to a corresponding set of data blocks associated with the parent snapshot, wherein determining that the subset of data blocks are identical comprises identifying the subset of data blocks provided by a user, without performing a block-by-block data comparison between the parent snapshot and the incremental snapshot;

generating storage path structure data associated with the incremental snapshot, wherein the storage path structure data includes (i) first path information associated with the subset of data blocks and (ii) second path information associated with one or more additional data blocks of the plurality of data blocks, wherein the first path information is included in parent storage path structure data associated with the parent snapshot, and the second path information is not included in parent storage path structure data associated with the parent snapshot; and storing the incremental snapshot in the data repository along with the storage path structure data.

11. The non-transitory computer-readable medium of claim 10, wherein the operations further comprise:

receiving, from a user computing device, a request to compute a snapshot block difference between the parent snapshot and the incremental snapshot;

generating a list of data blocks that are each associated with path information not included in the parent path information associated with the parent snapshot; and outputting the list of data blocks for presentation on the user computing device.

12. The non-transitory computer-readable medium of claim 11, wherein generating the list of data blocks comprises determining, for each respective data block associated with the incremental snapshot, whether path information associated with the respective data block is included in the parent path information associated with the parent snapshot.

13. The non-transitory computer-readable medium of claim 10, wherein the storage volume is implemented by a private data storage server of user, wherein the storage volume is not accessible by a public snapshot server that is in networked communication with the data repository.

14. The non-transitory computer-readable medium of claim 10, wherein the storage volume is implemented by a block store server on behalf of user, wherein the storage volume is accessible by a public snapshot server that is in networked communication with the data repository.

\* \* \* \* \*